US012385512B1

(12) United States Patent
Slack

(10) Patent No.: US 12,385,512 B1
(45) Date of Patent: Aug. 12, 2025

(54) LOCKING THREADED CONNECTION ASSEMBLY

(71) Applicant: NOETIC TECHNOLOGIES INC., Edmonton (CA)

(72) Inventor: Maurice William Slack, Edmonton (CA)

(73) Assignee: Noetic Technologies Inc., Edmonton (CA)

( * ) Notice: Subject to any disclaimer, the term of this patent is extended or adjusted under 35 U.S.C. 154(b) by 0 days.

(21) Appl. No.: 19/112,229

(22) PCT Filed: Aug. 19, 2024

(86) PCT No.: PCT/CA2024/000009
§ 371 (c)(1),
(2) Date: Mar. 14, 2025

(87) PCT Pub. No.: WO2025/039062
PCT Pub. Date: Feb. 27, 2025

Related U.S. Application Data

(60) Provisional application No. 63/533,516, filed on Aug. 18, 2023.

(51) Int. Cl.
F16B 7/18 (2006.01)
(52) U.S. Cl.
CPC ..................... F16B 7/18 (2013.01)
(58) Field of Classification Search
CPC ...... E21B 17/04; E21B 17/042; E21B 17/043; F16B 7/18; F16B 7/182; F16B 7/185;
(Continued)

(56) References Cited

U.S. PATENT DOCUMENTS 579,643 A 3/1897 Gleason
2,708,132 A 5/1955 O'Neill
(Continued)

FOREIGN PATENT DOCUMENTS

AU 2011244894 B2 5/2013
CA 2490496 A1 6/2005
WO 2017074259 A1 5/2017

OTHER PUBLICATIONS

International Search Report re PCT/CA2024/000009, completed by the ISA/CA on Oct. 29, 2024, and mailed by the ISA/CA on Nov. 6, 2024.
(Continued)

Primary Examiner — Jonathan P Masinick
(74) Attorney, Agent, or Firm — Donald V. Tomkins

(57) ABSTRACT

A connection assembly enabling torque transfer between coaxially-aligned components includes: an upper component carrying an upper spline; a lower component threadedly engageable with the upper component and carrying a lower spline: a coupling ring having first and second splines; and means for axially moving the coupling ring, relative to the upper and lower components, between a free position in which the coupling ring is freely rotatable relative to the connected upper and lower components, and a seated position in which the coupling ring is rotationally coupled to the upper component by engagement of the first coupling ring spline with the upper spline, and rotationally coupled to the lower component by engagement of the second coupling ring spline with the lower spline. The upper and lower splines have different numbers of evenly-spaced spline ridges, which on at least one of the upper spline and the lower spline are axially tapered.

18 Claims, 20 Drawing Sheets

(58) Field of Classification Search
CPC .......... F16B 7/187; F16B 7/04; F16B 7/0406;
F16B 7/0413; F16B 7/042; F16B 7/0426;
F16B 39/10
See application file for complete search history.

(56) References Cited

U.S. PATENT DOCUMENTS

| | | | |
|---|---|---|---|
| 4,512,596 A | 4/1985 | Obrecht | |
| 5,785,357 A | 7/1998 | Foster et al. | |
| 7,104,345 B2 | 9/2006 | Eppink | |
| 7,392,850 B2* | 7/2008 | Boyd | E21B 17/025 |
| | | | 166/385 |
| 7,493,960 B2 | 2/2009 | Leising et al. | |
| 7,887,098 B2 | 2/2011 | Aas | |
| 8,348,542 B2* | 1/2013 | Church | E21B 17/04 |
| | | | 403/314 |
| 9,133,968 B2 | 9/2015 | Elrick et al. | |
| 9,206,851 B2 | 12/2015 | Slaughter, Jr. et al. | |
| 9,915,387 B2 | 3/2018 | Holmen et al. | |
| 10,041,308 B2* | 8/2018 | Bowley | F16L 15/001 |
| 10,077,858 B2 | 9/2018 | Pallini, Jr. et al. | |
| 10,473,132 B2 | 11/2019 | Westgarth | |
| 10,513,891 B2* | 12/2019 | Daigle | F16L 15/08 |
| 10,605,012 B2 | 3/2020 | Loose-Mitchell et al. | |
| 10,954,753 B2* | 3/2021 | Fuehring | E21B 3/022 |
| 11,434,699 B2* | 9/2022 | Wajnikonis | F16L 15/003 |
| 11,559,875 B2* | 1/2023 | Sullivan | B25B 13/50 |
| 11,668,415 B2* | 6/2023 | Westgarth | E21B 23/02 |
| | | | 285/91 |
| 2019/0063649 A1 | 2/2019 | Snyder, II | |
| 2021/0148410 A1 | 5/2021 | Eppink | |

OTHER PUBLICATIONS

Written Opinion of the International Searching Authority re PCT/CA2024/000009, mailed by the ISA/CA on Nov. 6, 2024.

* cited by examiner

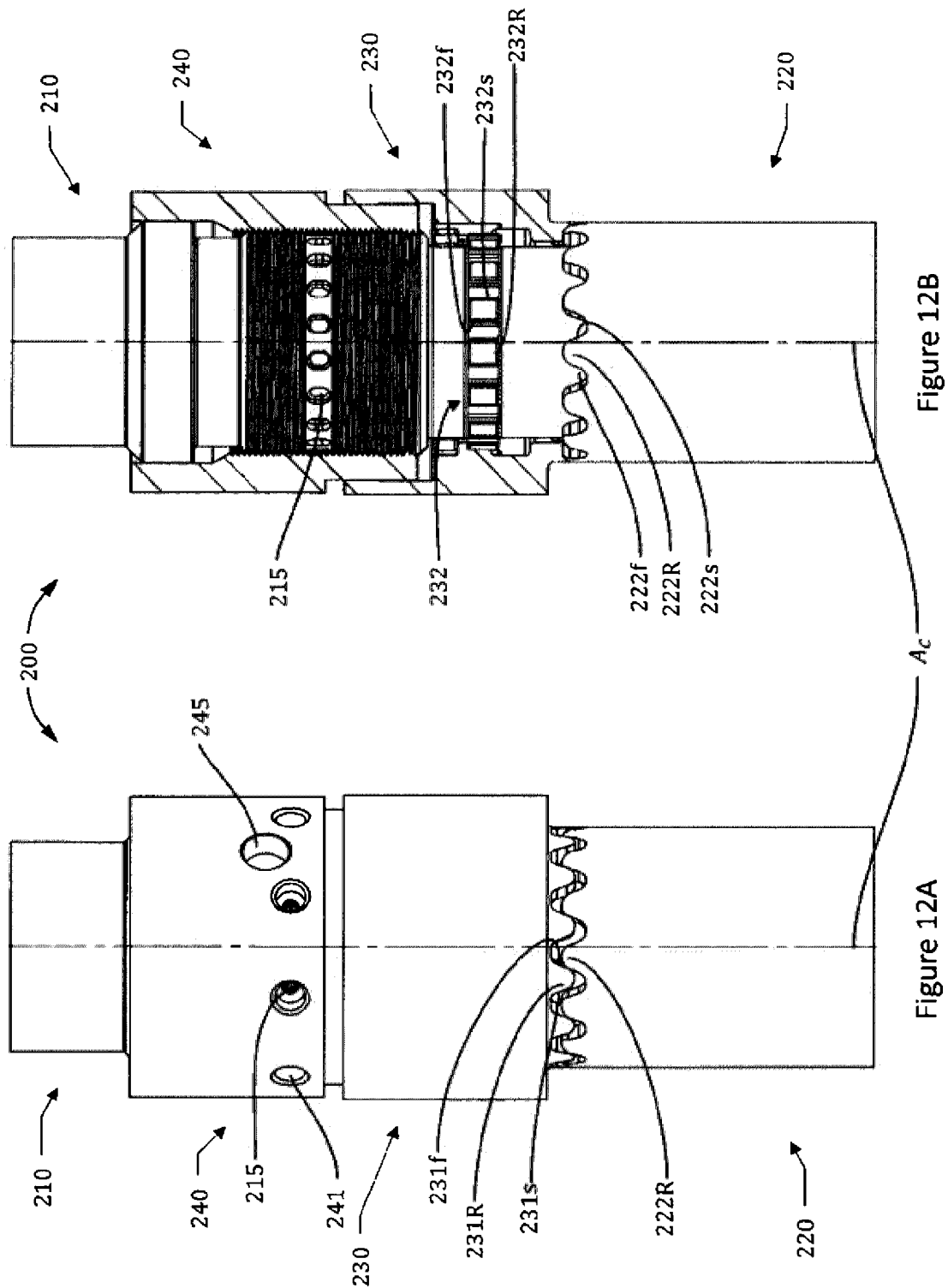

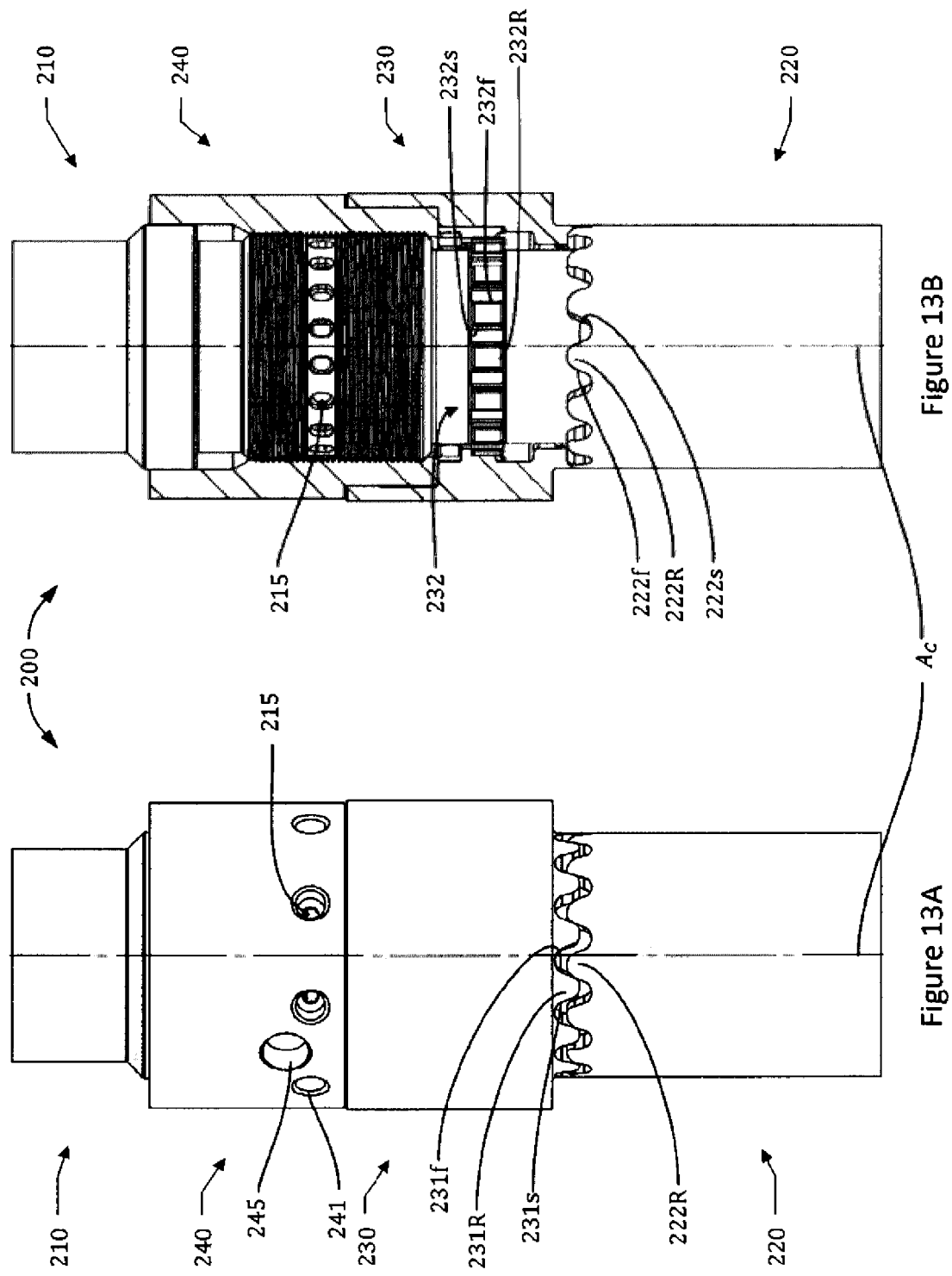

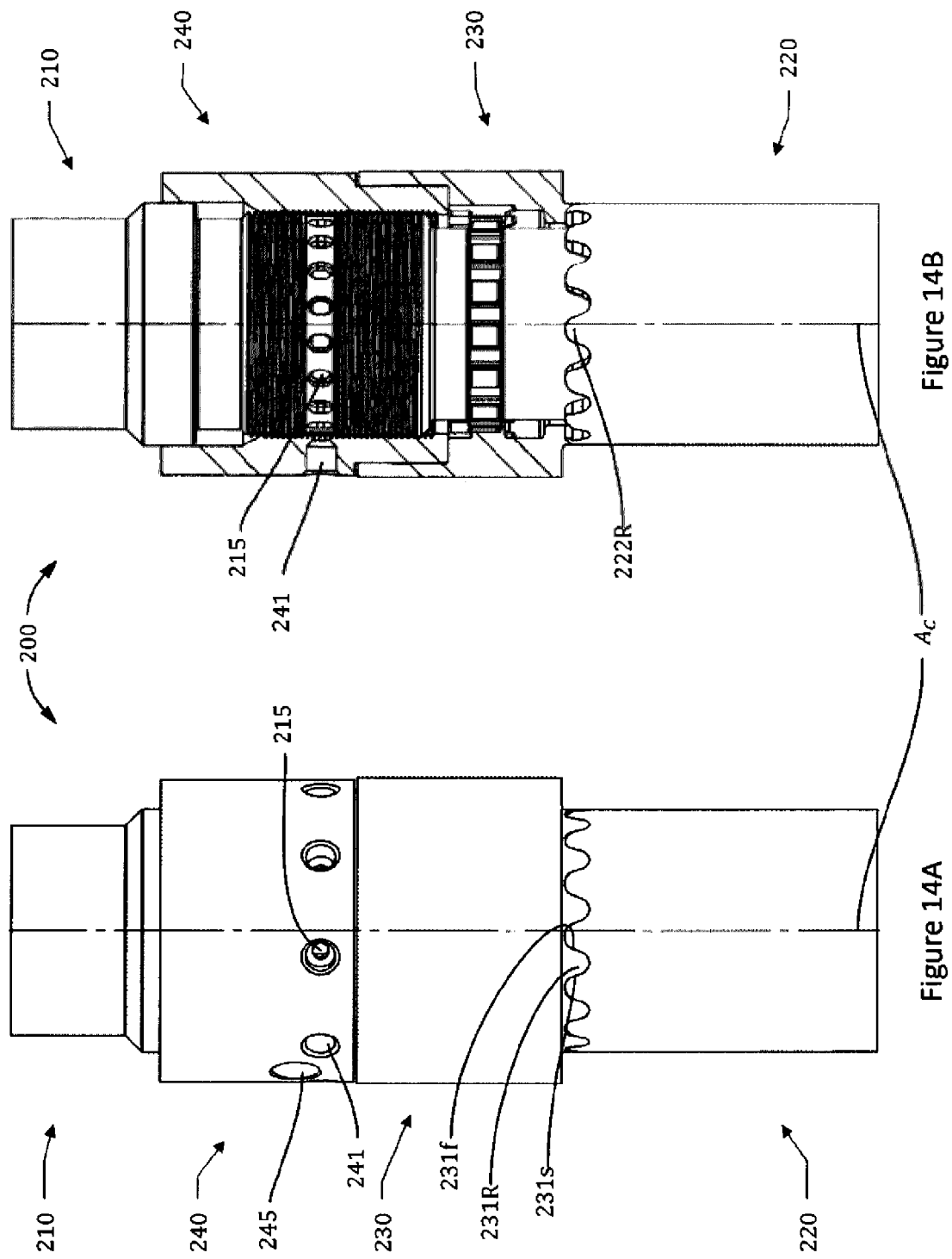

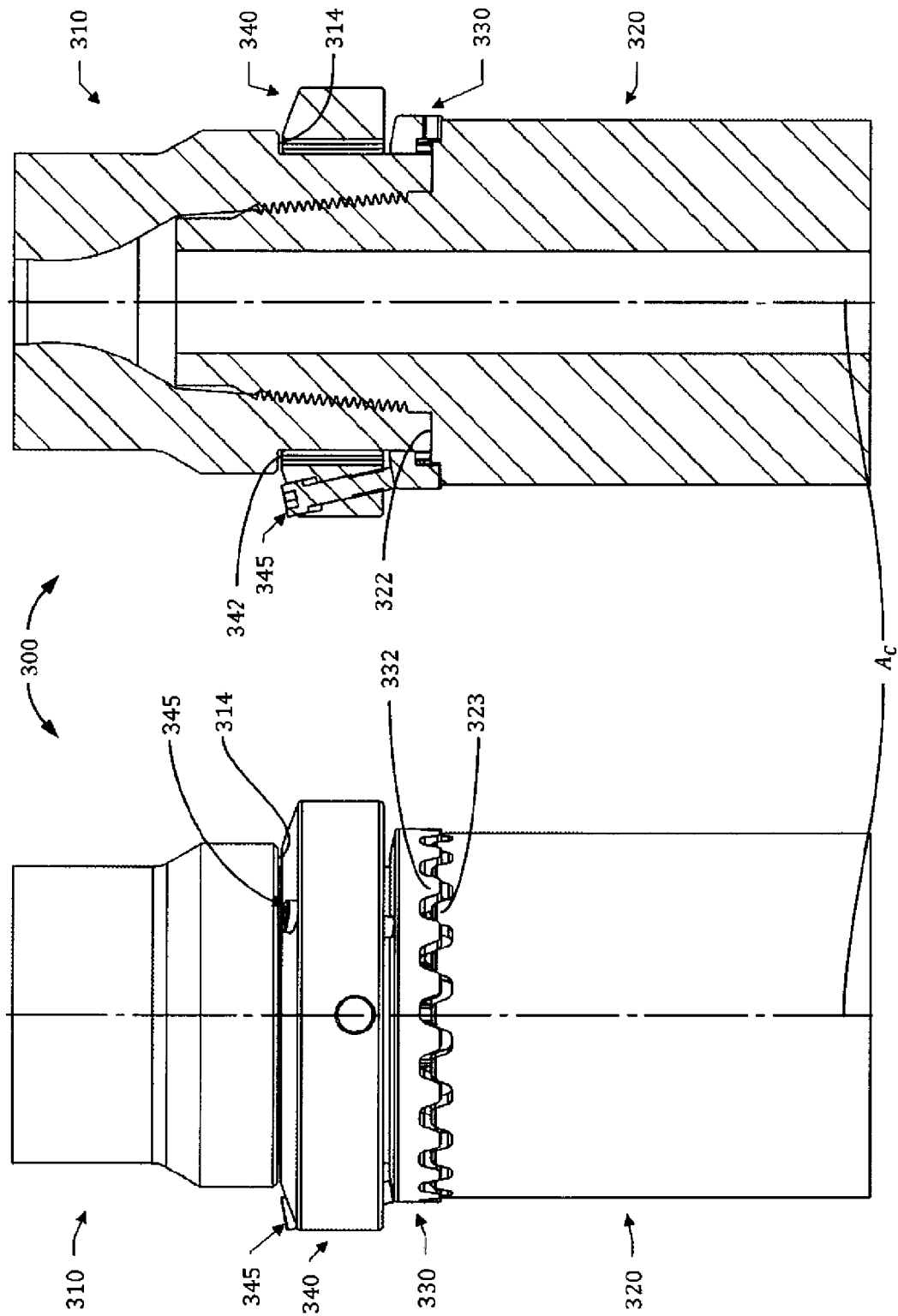

LOCKING THREADED CONNECTION ASSEMBLY

FIELD

The present disclosure relates in general to helically-threaded connections between axially-aligned components, and relates in particular to apparatus for preventing relative rotation between two such connected components.

BACKGROUND

A rotary shouldered connection (also known as an "RSC") is a type of helically-threaded connection commonly used to connect drill string components (e.g., pipe sections) and drilling tools (including an assembly of drilling tools for connection to a top drive of a drilling rig) for rotary drilling of subterranean wells. A typical RSC involves engagement of an external thread on a first component with an internal thread on a second component where the first and second components have respective annular shoulders that come into mating engagement as the threaded connection is made up. After these shoulders have come into contact, relative rotation between the two components will either increase or decrease the axial contact force acting between the shoulders, depending on the direction of rotation.

As used in this document: the phrasal verb "make up" means to tighten or assemble a threaded connection; the noun "makeup" refers to the process of tightening or assembling a threaded connection; the phrasal verb "break out" means to loosen or disassemble a threaded connection; and the noun "breakout" refers to the process of loosening or disassembling a threaded connection.

Common RSCs rely on frictional resistance, between the mating shoulders and between the two components' matingly engaged threads, to transfer torque between the components without either loosening or further tightening the connection. If an RSC is not made up to a torque sufficiently higher than the "breakout" torque (i.e., the minimum torque required to loosen the connection), it may unintentionally loosen (or "back off") when relative rotation is applied in the breakout direction. Such unintentional loosening can result in a drill string dropping into the wellbore, making it necessary to "fish" the drill string out of the wellbore, typically at great expense. The consequences of unintentional "backing off" can be even more severe in the case of an RSC above the drill floor, such as an RSC in an assembly of heavy drilling tools mounted to a top drive, in which case personnel on the drill floor could be seriously or fatally injured by the falling tools and/or auxiliary components.

Other drawbacks of conventional RSCs include the need for power tongs or other heavy equipment to make up and break out the RSCs, plus the related need for the connected components to provide a significant axial length for gripping by the tongs. Moreover, the tongs or other gripping equipment can cause significant surface damage to the connected components, making the components more susceptible to metal fatigue and consequently reduce their service life.

A further drawback of conventional RSCs is the risk of thread damage (also referred to as "galling") resulting from repeated application of the high torque necessary to make up and break out the RSCs. To mitigate the cost of repairing such damage, it is common for tools and other components with shouldered connections to be made longer than operationally necessary to allow for multiple repairs (removing damaged threads and machining new ones) before it becomes necessary to scrap the components.

Yet another drawback of conventional RSCs is their inherent inefficiency in transferring torque via frictional resistance between the two joined components' mating shoulders, which typically provide a comparatively small annular contact area with a comparatively small effective radius (or moment arm). The primary ways to increase the torque resistance of a shouldered connection are to increase the annular contact area and/or to increase the effective moment arm, which in either case would entail larger and/or differently configured components.

BRIEF SUMMARY

The present disclosure describes embodiments of threaded connection assemblies that are capable of bi-directional torque transfer while providing advantages over conventional RSCs that transfer torque by means of friction (or mechanical interference) between the annular shoulders of the connected components. Such advantages may include, without limitation, one or more of the following:

substantial reduction of the torque levels needed to induce shoulder interference for connection makeup, and to relieve shoulder interference for connection breakout;

prevention of relative rotation between the connected components during use, independent of the makeup torque (i.e., the torque applied to make up the connection);

provision of a fluid seal independent of the metal-to-metal seal induced between the mating load shoulders of the connected components by the applied makeup torque; and provision of higher combined torque and axial load rating than provided by equivalently-sized conventional oilfield tool joint connections.

As used in this patent document, the term "torque transfer element" denotes an annular element having a plurality of uniformly-spaced teeth engageable with teeth of a complementarily-configured torque transfer element. In this context, the terms "teeth" and "tooth" are to be understood in a broad sense and not as being limited to teeth of any particular configuration. Accordingly, and by way of non-limiting example only, the term "torque transfer element" is intended to cover a spline (as defined below), and the term "teeth" is intended to cover the uniformly-spaced ridges of such a spline. As a further non-limiting example, the mating components of a dog clutch (a term that will be familiar to persons skilled in the art) would be considered to be torque transfer elements in the context of the present disclosure.

As used in this patent document, the term "spline" denotes an annular arrangement of uniformly-spaced vertical spline ridges and intervening vertical spline grooves, and is intended to include, without limitation, splines in which the spline ridges have tapered, helical, or curvilinear flanks.

In broad terms, the present disclosure teaches embodiments of a threaded connection assembly comprising: an upper component having an upper torque transfer element comprising a plurality of uniformly-spaced teeth; a lower component threadingly engageable with the upper component and having a lower torque transfer element comprising a plurality of uniformly-spaced teeth; a coupling ring having a first coupling ring torque transfer element engageable with the upper torque transfer element, and a second coupling ring torque transfer element engageable with the lower torque transfer element, said coupling ring being axially movable between:

a free position in which the coupling ring is freely rotatable relative to both the upper component and the lower component; and a seated position in which the first coupling ring torque transfer element engages the upper torque transfer element, and the second coupling ring torque transfer element engages the lower torque transfer element, such that the coupling ring prevents relative rotation between the upper component and the lower component; and axial force means for urging the coupling ring from the free position toward the seated position.

The upper component, the lower component, and the coupling ring are coaxial about a longitudinal connection axis, and the upper torque transfer element and the lower torque transfer element have different numbers of teeth. Each tooth of the lower torque transfer element has an axially-tapered flank that is slidingly engageable with an axially-tapered flank on a tooth of the second coupling ring torque transfer element, such that when the teeth of the lower torque transfer element are rotationally misaligned (i.e., out of phase) with the teeth of the second coupling ring torque transfer element, movement of the coupling ring from the free position toward the seated position will urge relative rotation between the upper and lower components as a result of sliding engagement of the axially-tapered flanks of the teeth of the lower torque transfer element and the second coupling ring torque transfer element. When the coupling ring is in the free position, the coupling ring is rotatable to one or more selectable rotational positions in which the teeth of the lower torque transfer element are rotationally out of phase with the teeth of the second coupling ring torque transfer element.

In some embodiments, the upper torque transfer element comprises an external spline, and the first coupling ring torque transfer element comprises an internal spline.

In some embodiments, the lower torque transfer element comprises an external spline, and the second coupling ring torque transfer element comprises an internal spline.

In some embodiments, the lower torque transfer element and the second coupling ring torque transfer element are configured for engagement in the manner of a dog clutch.

In some embodiments, the teeth of the lower torque transfer element and the second coupling ring torque transfer element are at least partially of curvilinear configuration.

Optionally, the threaded connection assembly may comprise locking means for preventing relative rotation between the drive ring and a selected one of the upper and lower components. In such embodiment, the locking means may be provided by one or more locking lugs insertable through holes in the drive ring and into holes in the selected one of the upper and lower components, but this is by way of non-limiting example only.

Optionally, the threaded connection assembly may incorporate drive ring rotation means to facilitate rotation of the drive ring. By way of non-limiting example, such drive ring rotation means may be provided by forming one or more drive tool sockets in the drive ring, enabling manual rotation of the drive ring using a steel rod or other suitable tool inserted into one of the drive tool sockets.

In a variant embodiment, the coupling ring may be coaxially coupled to the upper component so as to follow a helically-rotating path (i.e., axial force applied to the coupling ring will induce both rotation and axial displacement of the coupling ring relative to the upper component).

In a first exemplary and non-limiting embodiment, a locking threaded connection assembly in accordance with the present disclosure has a longitudinal connection axis and comprises:
(a) an upper component having:
   a lower portion carrying an external helical connection thread;
   a downward-facing external annular connection shoulder above the external helical thread of the upper component; and
   an upper torque transfer element in the form of an external spline located above the external helical thread, with said external spline comprising a selected number $n_U$ vertical spline ridges and $n_U$ vertical spline grooves each being parallel to the longitudinal connection axis;
(b) a lower component having an upper end and:
   an upper portion carrying an internal helical connection thread matingly engageable with the external helical connection thread of the upper component;
   an upward-facing annular shoulder on an upper end of the lower component matingly engageable with the downward-facing annular connection shoulder of the upper component; and
   a lower torque transfer element in the form of an external spline on an upper portion of the lower component, said external spline having a selected number $n_L$ vertical spline ridges and $n_L$ vertical spline grooves, wherein $n_L$ is not equal to $n_U$, and wherein the flanks of the vertical spline ridges of the external spline are axially tapered (alternatively referred to as having a helix angle) such that the circumferential width of each vertical spline groove of the external spline decreases toward its lower end;
(c) a coupling ring having a coupling ring throughbore defining:
   a first coupling ring torque transfer element in the form of an upper internal spline having $n_U$ vertical spline ridges and $n_U$ vertical spline grooves, with the vertical spline ridges of said upper internal spline being slidingly engageable within the vertical spline grooves of the external spline on the upper component; and
   a second coupling ring torque transfer element in the form of a lower internal spline having a selected number $n_L$ vertical spline ridges and $n_L$ vertical spline grooves, wherein the flanks of the vertical spline ridges of the lower internal spline are axially tapered such that the circumferential width of each vertical spline ridge of the lower internal spline decreases in width toward its lower end so as to be matingly engageable with a tapered vertical spline groove of the external spline of the lower component, and
(d) means for urging axial movement of the coupling ring relative to the upper and lower components, between a free position and a seated position, when the upper and lower components are threadingly connected with their annular connection shoulders in contact and the coupling ring is mounted around the connected upper and lower components;

wherein:
(e) when the coupling ring is in the free position, the coupling ring will be freely rotatable relative to the connected upper and lower components;
(f) when the coupling ring is in the seated position, the coupling ring will be:

rotationally coupled to the upper component by engagement of the upper internal spline of the coupling ring and the external spline on the upper component; and rotationally coupled to the lower component by engagement of the lower internal spline of the coupling ring and the external spline on the lower component; and (g) the axial taper angle of the flanks of the vertical spline ridges of the external spline on the lower component and the axial taper angle of the vertical ridges of the lower internal spline of the coupling ring are selected such that movement of the coupling ring from the free position to the seated position will urge relative rotation of the upper and lower components in a first rotational direction as a result of vertically-sliding engagement of the tapered flanks of the vertical spline ridges of the lower internal spline of the coupling ring with the tapered flanks the vertical spline ridges of the external spline on the lower component.

In variant embodiments, the external helical thread could be on the lower component instead of on the upper component as in the above-described embodiment. Also, the shouldering surfaces could be located at either end of the helical thread. In further variant embodiments, the ridges of the external spline on the lower component and the lower internal spline of the coupling ring could have tapered flanks on one side only (with the opposite flanks being parallel to the connection axis), thus enabling incremental relative rotation of the upper and lower components in one rotational direction only. More typically, however, the flanks on both sides of the spline ridges are tapered to enable incremental relative rotation in either direction (i.e., for either connection makeup or connection breakout). In embodiments having tapered flanks on both sides of the spline ridges, the taper angle (relative to the longitudinal connection axis) could be different on either side of the flanks.

Threaded connections that employ two spline pairs in a manner similar to a vernier scale are known in the prior art, such as in U.S. Pat. No. 7,104,345 (Eppink), U.S. Pat. No. 7,493,960 (Leising et al.), U.S. Pat. No. 7,887,098 (Aas), and U.S. Pat. No. 105,153,891 (Daigle et al.). Embodiments of threaded connection assemblies in accordance with the present disclosure also comprise two spline pairs in a manner similar to a vernier scale. In the first exemplary embodiment described above, the phase alignment between the lower internal spline of the coupling ring and the external spline on the lower component will vary according to the coupling ring's rotational position relative to the lower component.

Additionally, in embodiments of locking threaded connection assemblies in accordance with the present disclosure, the rotational position of the coupling ring may be selected such that movement of the coupling ring from the free position to the seated position will urge relative rotation of the upper and lower components in a first rotational direction (e.g., tending to further tighten the threaded connection of the upper and lower components). In some embodiments, the rotational position of the coupling ring may also be selected such that movement of the coupling ring from the free position to the seated position will urge relative rotation of the upper and lower components in a second rotational direction (e.g., tending to loosen the threaded connection).

Optionally, one or both of the axially-tapered flanks of the vertical spline ridges of the lower internal spline of the coupling ring and the external spline on the lower component may follow a helical profile.

Optionally, the flanks of the vertical spline ridges of the external spline on the upper component may be axially tapered such that the circumferential width of each vertical spline groove of the external spline decreases toward its lower end, and the flanks of the vertical spline ridges of the upper internal spline on the coupling ring are axially tapered such that the circumferential width of each vertical spline ridge of the upper internal spline decreases toward its lower end so as to be matingly engageable with a tapered vertical spline groove of the external spline of the upper component.

The axially-tapered spline ridge flanks provide a mechanical advantage converting the axial force to circumferentially tangential force urging relative rotation between the upper and lower components. The means for urging axial movement of the coupling ring relative to the upper and lower components may also provide an additional mechanical advantage in generating an axial force on the coupling ring.

In some embodiments, the means for urging axial movement of the coupling ring relative to the upper and lower components may comprise a drive ring threadingly engageable with the coupling ring and having an annular shoulder configured for mating engagement with an annular shoulder on a selected one of the upper component and the lower component. Rotation of the drive ring relative to the coupling ring will urge axial movement of the coupling ring relative to the upper and lower components.

In alternative embodiments, the drive ring may have an annular shoulder configured for mating engagement with an annular shoulder on the coupling ring, with the drive ring being threadingly engageable with a selected one of the upper component and the lower component. Rotation of the drive ring relative to the selected component will urge axial movement of the coupling ring relative to the upper and lower components.

In further alternative embodiments, the means for urging axial displacement of the coupling ring relative to the upper and lower components may comprise a plurality of jackscrews threadingly engaging a plate, wherein:

the plate has an axial surface contacting an axial shoulder surface on a selected one of the upper component and the lower component, and the jackscrews bear against the coupling ring;

such that rotation of the jack screws relative to the plate will urge axial movement of the coupling ring relative to the upper and lower components.

The upper and lower components may be cylindrical components having respective internal bores, in which case the coupling ring may be coaxially aligned with the upper and lower components and may be located within the internal bore of one or both the upper and lower tubular components.

Optionally, rotary shouldered threaded connection assemblies in accordance with the present disclosure may further comprise an elastomeric seal element configured to prevent fluid leakage at the connection between the internal bores of the upper and lower components.

In variant embodiments, the configuration of the threaded connection assembly may be reversed—. i.e., with the coupling ring engaging axially-tapered splines provided on the upper component (rather than on the lower component as in the embodiments described above), and with the drive ring shouldering against the lower component.

BRIEF DESCRIPTION OF THE DRAWINGS

An embodiment in accordance with the present disclosure will now be described with reference to the accompanying Figures, in which numerical references denote like parts, and in which:

FIGS. 13A and 13B, respectively, are elevation and partial cross-section views of the connection assembly in FIG. 8 with the drive ring partially axially extended from the upper component such that a shoulder of the drive ring contacts a shoulder of the coupling ring.

FIGS. 14A and 14B, respectively, are elevation and partial cross-section views of the connection assembly in FIG. 8 with the drive ring further axially extended from the upper component such that the tapered spline of the coupling ring has been urged into full alignment with the tapered spline of the lower component and, simultaneously, the lower component has been urged to rotate relative to the upper component.

FIGS. 18A and 18B, respectively, are elevation and partial cross-section views of the connection assembly in FIG. 16, shown with the coupling ring rotated and then axially translated to a position in which the teeth of the second coupling ring torque transfer element are partially misaligned from the teeth of the lower torque transfer element, and with jackscrews partially axially extended downward from the drive plate such that the jackscrews bear on the coupling ring.

DETAILED DESCRIPTION

First Exemplary Embodiment

Figure 1:
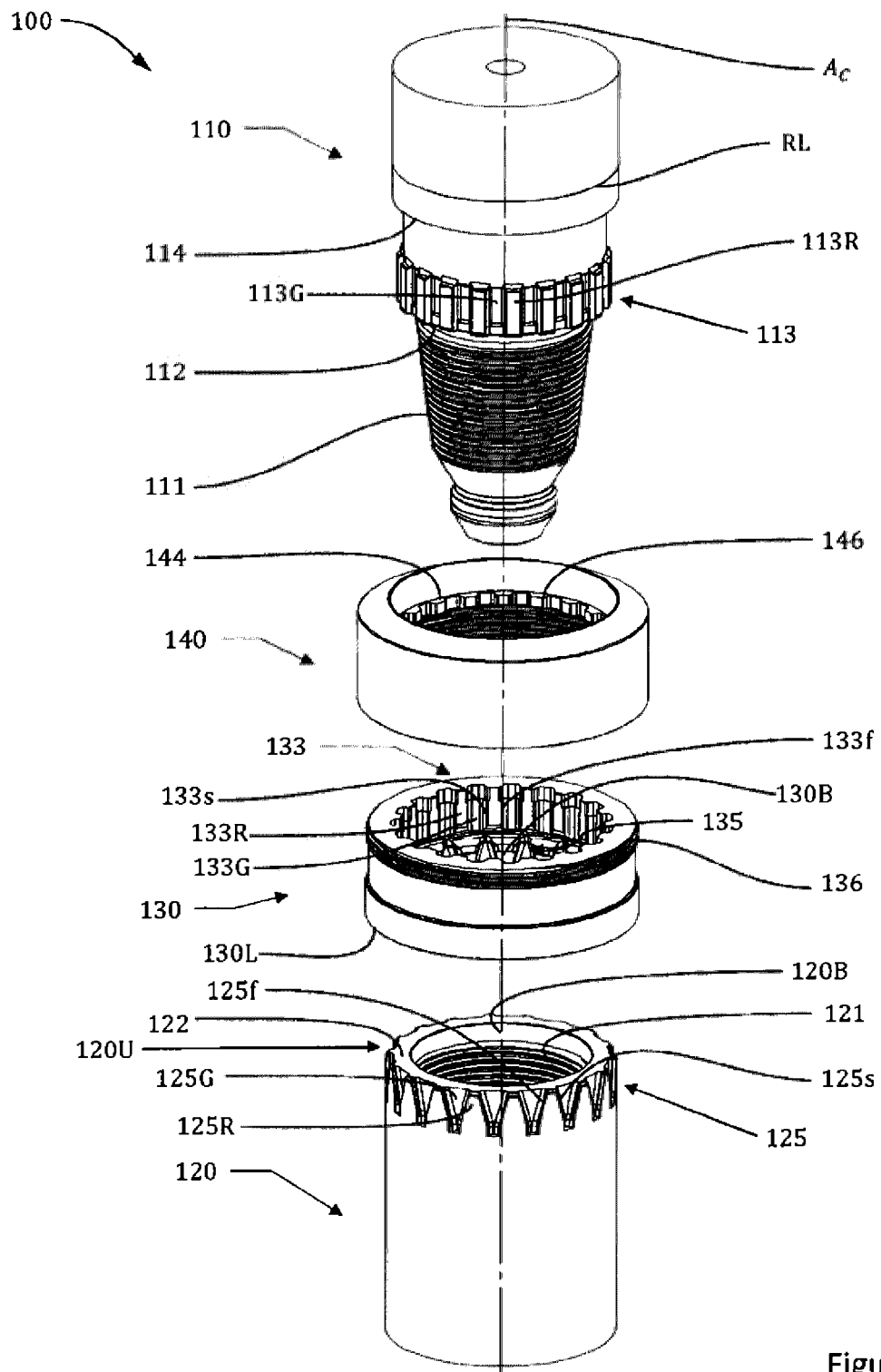
FIG. 1 is an exploded isometric view of a first embodiment of a locking threaded connection assembly in accordance with the present disclosure.
Figure 2:
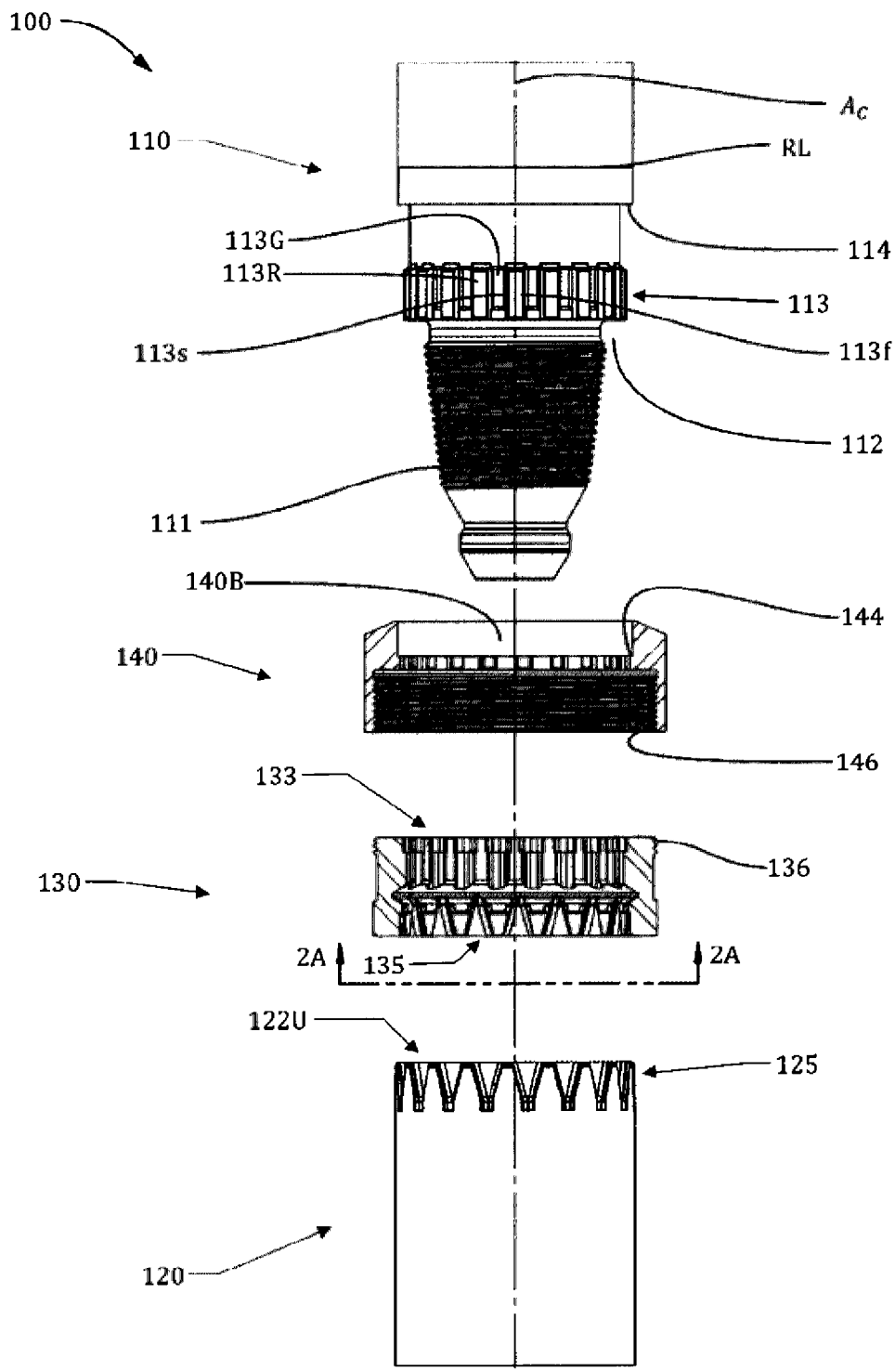
FIG. 2 is exploded elevation of the connection assembly in FIG. 1, with the coupling ring and the drive ring shown in cross-section.
Figure 3:
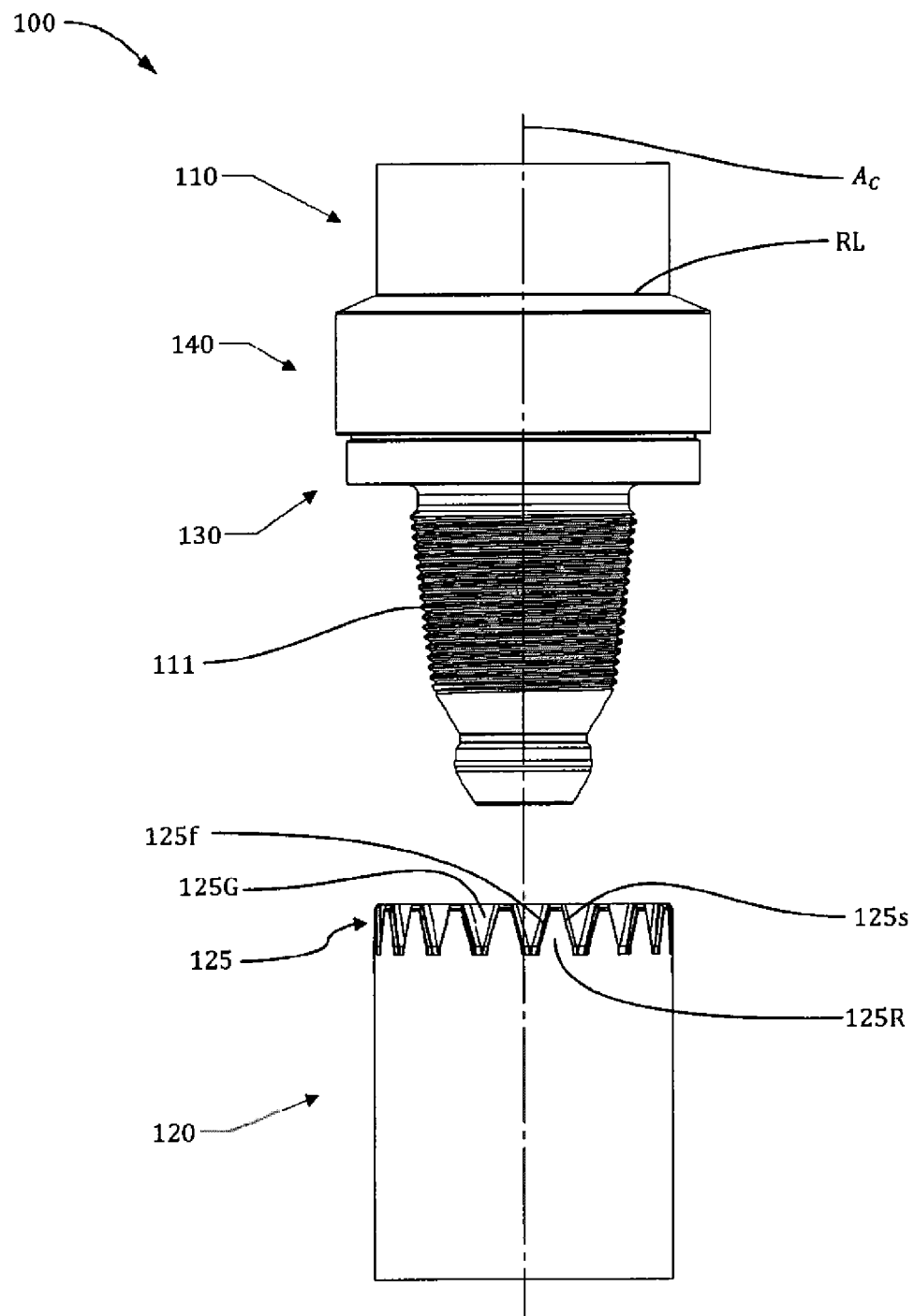
FIG. 3 is an elevation view of the (partially assembled) connection assembly in FIG. 1 in preparation for a connection makeup operation.
Figure 4:
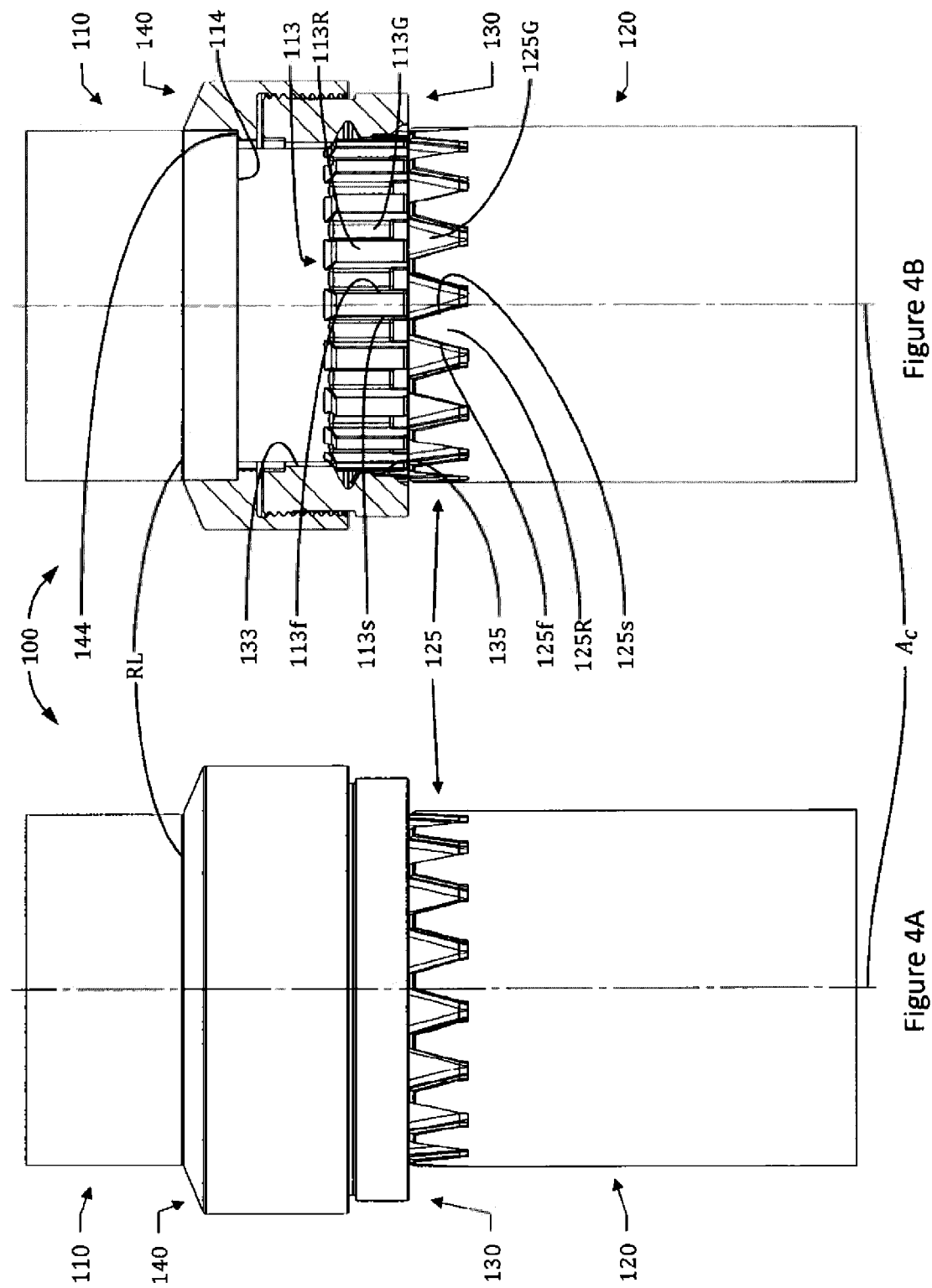
FIGS. 4A and 4B, respectively, are elevation and partial cross-section views of the connection assembly in FIG. 1 with an external thread on the upper component engaged to an internal thread on the lower component at a hand-tight position in the connection makeup operation.
Figure 5:
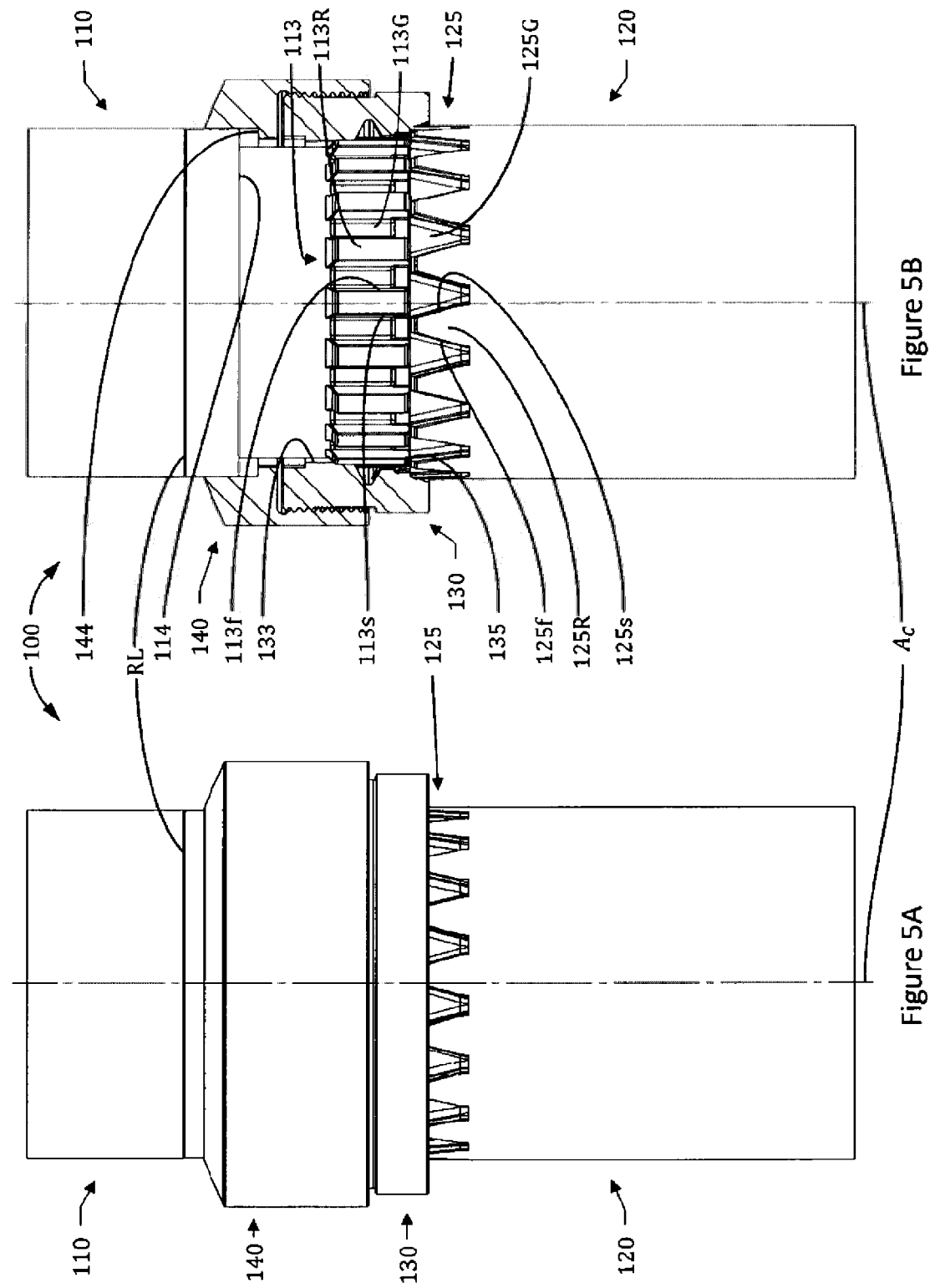
FIGS. 5A and 5B, respectively, are elevation and partial cross-section views of the connection assembly in FIG. 1 with coupling and drive rings rotated and then axially translated to a position where a tapered internal spline on the coupling ring is partially misaligned from a tapered external spline on the lower component.
Figure 6:
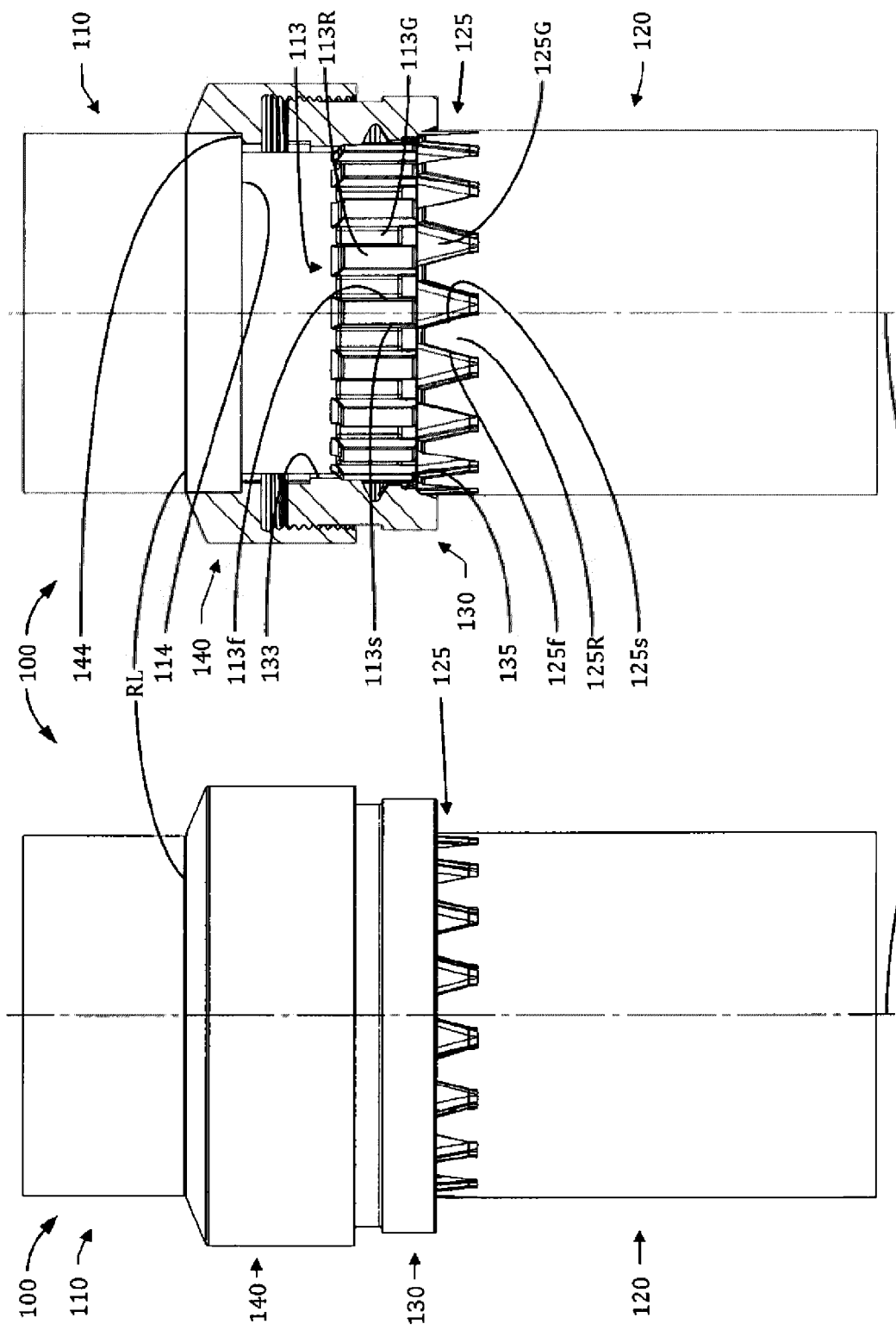
FIGS. 6A and 6B, respectively, are elevation and partial cross-section views of the connection assembly in FIG. 1 with the drive ring partially axially extended from the coupling ring such that a shoulder of the drive ring contacts a shoulder of the upper component.
Figure 7:
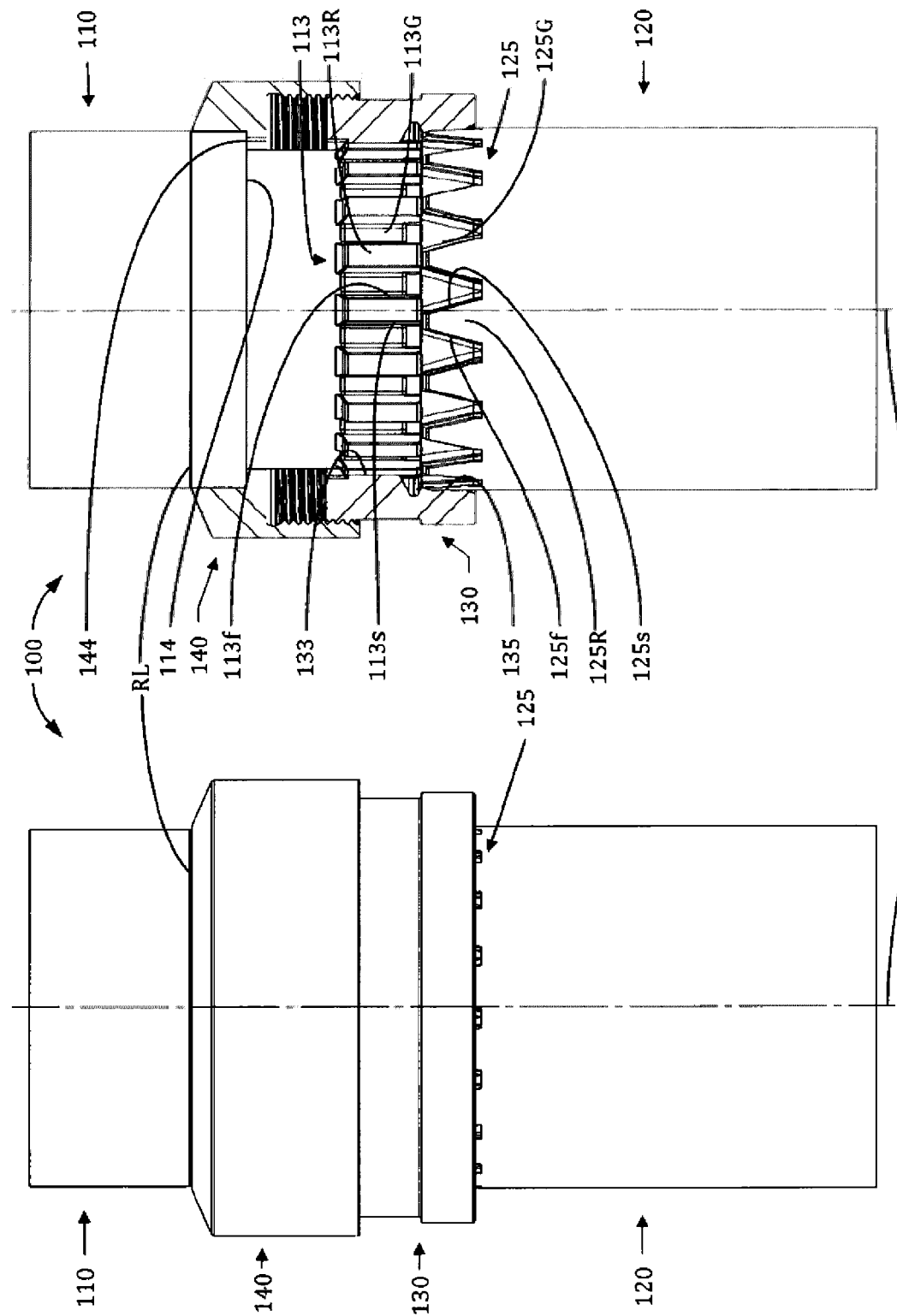
FIGS. 7A and 7B, respectively, are elevation and partial cross-section views of the connection assembly in FIG. 1 with the drive and coupling rings further axially extended from each other such that the tapered spline of the coupling ring has been urged into full alignment with the tapered spline of the lower component and, simultaneously, the lower component has been urged to rotate relative to the upper component.

FIGS. 1-7B illustrate a first exemplary embodiment 100 of a locking threaded connection assembly in accordance with the present disclosure. As shown in FIGS. 1-3, connection assembly 100 has a longitudinal connection axis $A_C$ and comprises an upper component 110, a lower component 120 having an upper end 120U and an axial bore 120B extending downward from upper end 120U, a coupling ring 130 having a lower end 130L and a throughbore 130B, and a drive ring 140 having a throughbore 140B.

Upper component 110 has an external connection thread 111 configured for engagement with an internal connection thread 121 in axial bore 120B of lower component 120. In this particular illustrated embodiment, and by way of non-limiting example only, connection threads 111 and 121 are shown as right-handed threads, and for drawing simplicity, are represented in FIGS. 1-7B as a set of circumferential grooves and ridges.

Upper component 110 has a downward-facing connection shoulder 112 configured for contact with an upward-facing connection shoulder 122 on lower component 120.

Figure 2A:
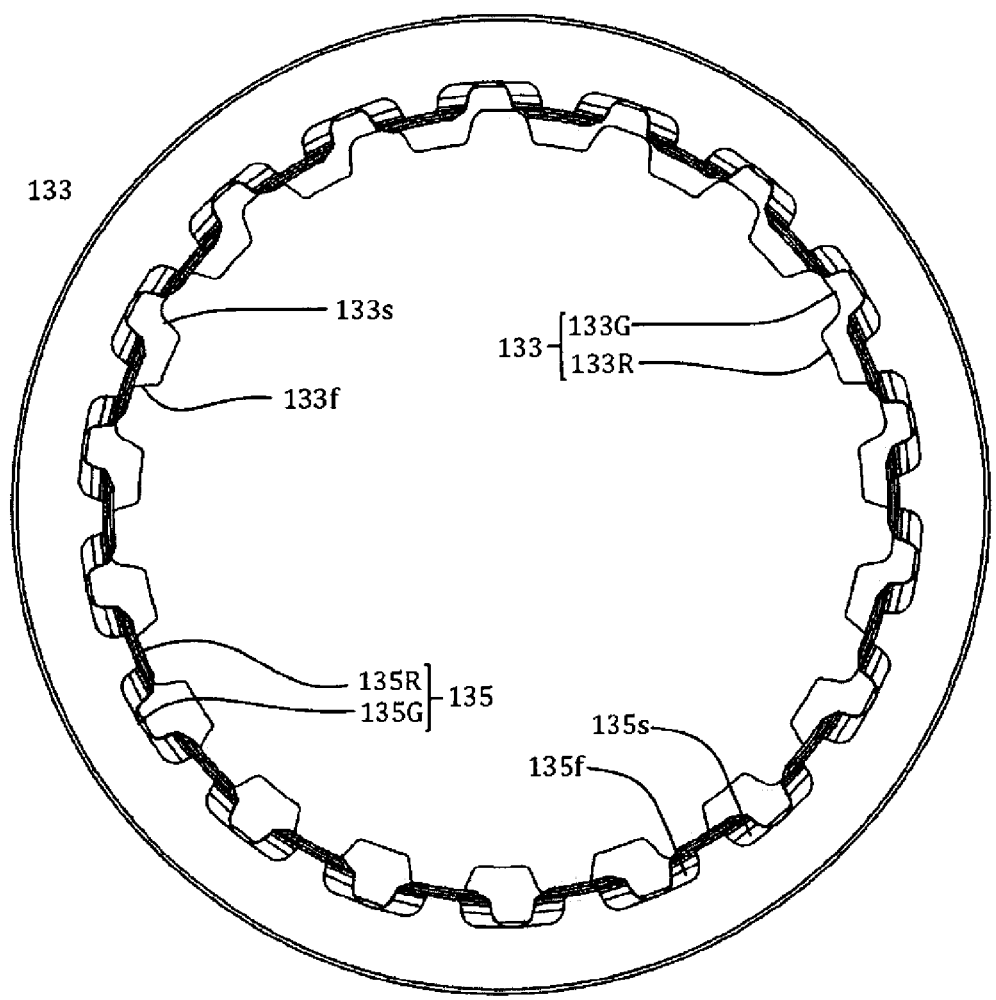
FIG. 2A is an axially-upward view of the coupling ring shown in FIGS. 1 and 2.

Upper component 110 has an external upper spline 113 having a selected number $n_U$ spline ridges 113R and a corresponding number of spline grooves 113G, with each spline ridge 113R being configured to have a zero helical angle relative to longitudinal connection axis $A_C$, with spline 113 being configured for axial sliding engagement with an internal upper spline 133 in throughbore 130B of coupling ring 130. Similar to external spline 113, spline 133 has $n_U$ spline ridges 133R and a corresponding number of spline grooves 133G as shown in FIG. 2A, with each spline ridge 133R being configured to have a zero helical angle. Each spline ridge 113R on upper spline 113 has a first ridge flank 113f configured for sliding engagement with a first ridge flank 133f on upper spline 133, plus a second ridge flank 113s configured for sliding engagement with a second ridge flank 133s of a spline ridge 133R on upper spline 133. In the illustrated embodiment (and by way of non-limiting example only), the value of $n_U$=19.

Upper component 110 has a downward-facing drive shoulder 114 configured for contact with an upward-facing drive shoulder 144 on drive ring 140.

Upper end 120U of lower component 120 defines an external lower spline 125 having a selected number $n_L$ of spline ridges 125R and a corresponding number of spline grooves 125G, with the value of $n_L$ being different from the value of $n_U$. Spline 125 is configured for engagement with an internal lower spline 135 in throughbore 130B of coupling ring 130, below internal upper spline 133. Similar to lower spline 125, internal lower spline 135 has $n_L$ spline ridges 135R and a corresponding number of spline grooves 135G as shown in FIG. 2A. Each spline ridge 125R also has a first flank 125f configured for engagement with a first flank 135f of a spline ridge 135R on lower spline 135. First flanks 125f and 135f are axially tapered, with the tapered flank surfaces preferably (but not necessarily) following fully mating helical profiles. Each spline ridge 125R also has a second flank 125s configured for engagement with a second flank 135s of a spline ridge 135R on lower spline 135. Second flanks 125s and 135s are axially tapered, with the tapered flank surfaces preferably (but not necessarily) following fully mating helical profiles. In the embodiment shown in FIGS. 1-7B (and by way of non-limiting example only), the value of $n_L$=18. Although $n_L$ is less than $n_U$ and the difference between $n_L$ and $n_U$ is one in this particular example, it is to be understood that $n_L$ could be greater than or equal to $n_U$ in alternative embodiments, and that the difference between $n_L$ and $n_U$ could be greater than one.

The taper angle of first flanks 125f and 135f and the taper angle of second flanks 125s and 135s may be (but are not necessarily) the same. The value of the taper angles, otherwise understood as helix angles, of the flank surfaces is shown in the illustrated embodiment as being approximately 15 degrees relative to connection axis $A_C$. However, this is by way of non-limiting example only, and selection of the taper angle will typically be based on whether the user wants the spline engagement to be self-releasing or locking. More specifically, the included angle between the helix or taper angle of external upper spline 113 on upper component 110 (which will be zero when the flanks of upper spline 113 are parallel to connection axis $A_C$) and the helix or taper angle of lower spline 125 on lower component 120 must exceed a threshold value in order for the spline engagement to be self-releasing and non-locking, and this threshold value can be readily determined in accordance with methods familiar to persons of ordinary skill in the art, taking into consideration relevant variables such as material properties and friction coefficients.

Coupling ring 130 has an external drive thread 136 configured for engagement with an internal drive thread 146 on drive ring 140.

FIG. 3 is an elevation view of assembly 100 partially assembled in preparation for a connection makeup operation. Prior to making up connection threads 111 and 121, rings 130 and 140 are threaded together (via drive threads 136 and 146) to a minimum combined axial length (retracted length). Drive shoulder 144 and throughbore 140B of drive ring 140 are profiled so that drive ring 140 may axially pass over upper spline 113 on upper component 110. Rings 130 and 140 are slidingly mounted around upper component 110 with drive shoulders 114 and 144 in contact.

Connection Makeup Procedure

FIGS. 4A and 4B, respectively, are elevation and partial cross-section views of assembly 100 at a hand-tight position in the connection makeup operation. Connection threads 111 and 121 are engaged and connection shoulders 112 and 122 are in contact with a small contact force. Upper splines 113 and 133 are not engaged, and splines 125 and 135 are also not engaged. Coupling ring 130 is in a free position and may rotate freely, together with drive ring 140, on upper component 110. There are $n_U$=19 rotational positions that may be selected at which rings 130 and 140 may be axially lowered together to engage upper spline 113 with upper spline 133. The phase difference (amount of misalignment) between lower splines 125 and 135 will depend on the selected rotational position of coupling ring 130, similar to a vernier scale.

FIGS. 5A and 5B, respectively, are elevation and partial cross-section views of connection assembly 100 with rings 130 and 140 shown rotated to a selected rotational position and lowered, engaging upper splines 113 and 133. At the selected rotational position, lower splines 125 and 135 are misaligned (i.e., out of phase) such that axially-tapered first ridge flanks 125f and 135f are only partially engaged.

In the next step of the connection makeup operation, drive ring 140 is rotated relative to coupling ring 130 causing rings 130 and 140 to extend in combined length until drive shoulders 144 and 114 come into contact. FIGS. 6A and 6B, respectively, are elevation and partial cross-section views showing connection assembly 100 after this step of the makeup operation.

In the final step of the connection makeup operation, drive ring 140 is further rotated relative to coupling ring 130, urging coupling ring 130 downward. As coupling ring 130 moves downward, tapered splines 135 and 125 move toward in-phase alignment as a result of the sliding engagement of the corresponding contacting spline ridge flanks (125f and 135f), and lower component 120 incrementally rotates relative to upper component 110, thus tightening the threaded connection of upper and lower components 110 and 120. FIGS. 7A and 7B, respectively, are elevation and partial cross-section views of connection assembly 100 at the end of the connection makeup operation. Coupling ring 130 is in a seated position.

The torque required to rotate drive ring 140 relative to coupling ring 130 during the final makeup step is substantially less than the resulting torque that urges relative rotation between lower component 120 and upper component 110, due to the mechanical advantage provided by the relative sliding action of drive threads 136 and 146; and the relative sliding action of first ridge flanks 125f and 135f. The magnitude of mechanical advantage will vary according to factors including the lead angle of drive threads 136 and 146, the taper angle of first ridge flanks 125f and 135f, and the friction forces between the sliding surfaces.

When desired, the threaded connection of upper and lower components 110 and 120 may be tightened further by performing the additional steps of:

1. rotating drive ring 140 relative to coupling ring 130 to axially retract rings 130 and 140 relative to each other;

2. raising rings 130 and 140 together until drive shoulders 144 and 114 contact and coupling ring 130 is in a free position where upper splines 133 and 113 are disengaged, lower splines 135 and 125 are disengaged, and rings 130 and 140 are free to rotate around upper component 110;
3. rotating rings 130 and 140 together and selecting a new position of the $n_U$=19 rotational positions at which rings 130 and 140 may be axially lowered together to engage upper splines 113 and 133 and wherein lower splines 125 and 135 partially engage axially-tapered first ridge flanks 125$f$ and 135$f$; and
4. rotating drive ring 140 relative to coupling ring 130 to axially extend rings 130 and 140 relative to each other until coupling ring 130 is in a seated position, tapered lower splines 135 and 125 are in-phase aligned, and lower component 120 has rotated relative to upper component 110 to further incrementally tighten the threaded connection therebetween. Steps 1-4 above may be repeated as many times as necessary to achieve a desired tightness of the threaded connection.

After the connection makeup operation, assembly 100 is locked from further relative rotation between upper component 110 and lower component 120 by rings 130 and 140. Torque transmitted between upper component 110 and lower component 120 in excess of the torque resisted by friction between connection threads 111 and 121 and between connection shoulders 112 and 122 will flow through coupling ring 130 via upper splines 113 and 133 and via lower splines 125 and 135.

Coupling ring 130 is held axially in place, with both upper splines 113 and 133 engaged and lower splines 125 and 135 engaged, by drive ring 140. Unintentional rotation of drive ring 140 relative to coupling ring 130 (and upper component 110) will be resisted by friction between drive threads 136 and 146 and between drive shoulders 114 and 144.

The torque required to rotate drive ring 140 to urge axial movement of coupling ring 130 and resultant incremental rotation between upper component 110 and lower component 120 is much less than the torque required to directly urge incremental rotation between upper component 110 and lower component 120 due to the mechanical advantage provided by the helical sliding engagement of first flanks 125$f$ and 135$f$ and the additional mechanical advantage provided by the helical sliding engagement of internal drive thread 146 and external drive thread 136. In this first exemplary embodiment, the total combined mechanical advantage provided by first flanks 125$f$ and 135$f$ and by drive threads 146 and 136 is 10 to 1 (i.e., the torque required to rotate drive ring 140 is 1/10 of the torque required to directly urge incremental rotation between components 110 and 120).

Connection Breakout Procedure

Rings 130 and 140 may also be used to loosen the threaded connection of upper and lower components 110 and 120 by performing the steps of:
1. rotating drive ring 140 relative to coupling ring 130 to axially retract rings 130 and 140 relative to each other;
2. raising rings 130 and 140 together until drive shoulders 144 and 114 contact and coupling ring 130 is in a free position where upper splines 133 and 113 are disengaged, lower splines 135 and 125 are disengaged, and rings 130 and 140 are free to rotate around upper component 110;
3. rotating rings 130 and 140 together and select a new position of the $n_U$=19 rotational positions at which rings 130 and 140 may be axially lowered together to engage upper splines 113 and 133 and wherein lower splines 125 and 135 partially engage axially-tapered second ridge flanks 125$s$ and 135$s$; and
4. rotating drive ring 140 relative to coupling ring 130 to axially extend rings 130 and 140 relative to each other until coupling ring 130 is in a seated position, tapered lower splines 135 and 125 are in-phase aligned, and lower component 120 a has rotated relative to upper component 110 to incrementally loosen the threaded connection therebetween.

FIGS. 1, 2, 3, and 4A-7B show an optional circumferential reference line RL that may be marked by any suitable means on an upper portion of upper component 110 to provide a visual indication of axial movement of drive ring 140 relative to upper component 110, and thereby to assist a user in determining the state of connection assembly 100 during a connection makeup or breakout operation. By way of non-limiting example only, reference line RL is shown as being coincident with an upper cylindrical edge of drive ring 140 in FIGS. 3, 4A, 4B, and 6A-7B.

Second Exemplary Embodiment

Figure 8:
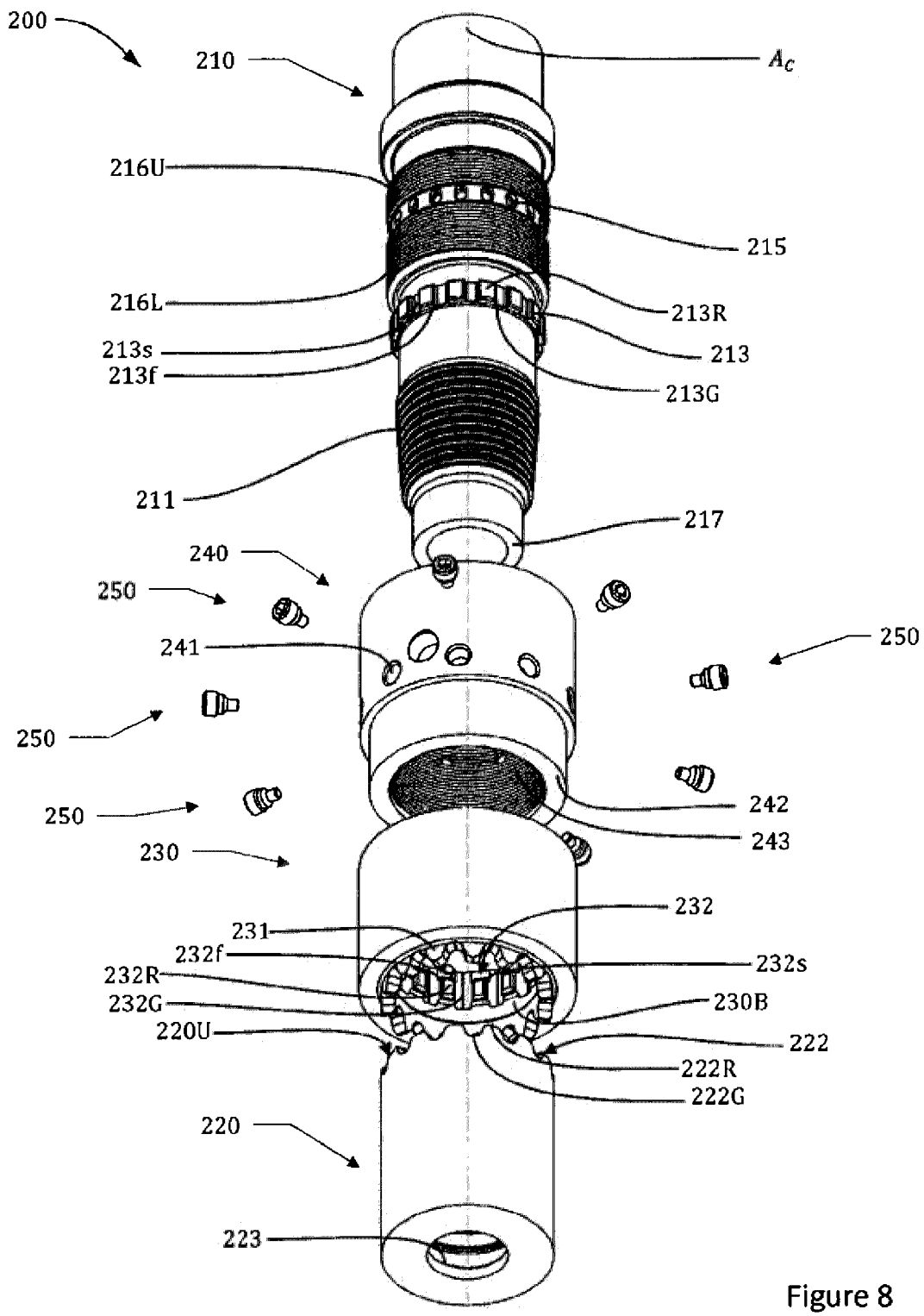
FIG. 8 is an exploded isometric view of a second embodiment of a locking threaded connection assembly in accordance with the present disclosure.
Figure 9:
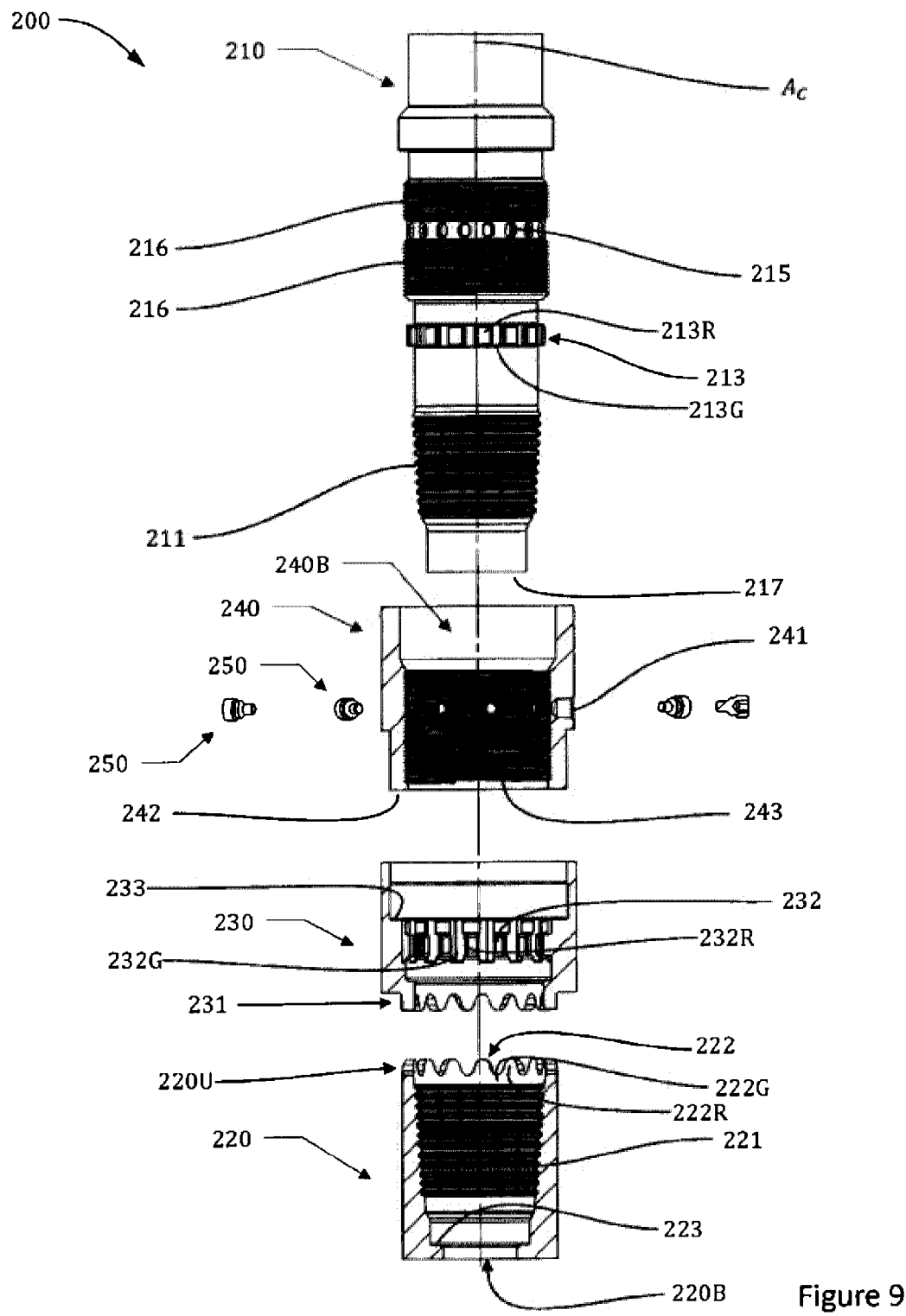
FIG. 9 is exploded elevation of the connection assembly in FIG. 8, with the lower component, the coupling ring, and the drive ring shown in cross-section.

FIGS. 8-15B illustrate a second exemplary embodiment 200 of a locking threaded connection assembly in accordance with the present disclosure. As shown in FIGS. 8 and 9, connection assembly 200 has a longitudinal connection axis $A_C$ and comprises an upper component 210, a lower component 220 having an upper end 220U and an axial bore 220B extending downward from upper end 220U, a coupling ring 230 having an axial throughbore 230B and a lower end 230L, a drive ring 240 having an axial throughbore 240B, and one or more locking lugs 250.

Upper component 210 has an external connection thread 211 configured for engagement with an internal connection thread 221 in bore 220B of lower component 220. In this particular illustrated embodiment, and by way of non-limiting example only, connection threads 211 and 221 are shown as mating tapered right-handed helical threads. For drawing simplicity, connection threads 211 and 221 are represented in FIGS. 8 to 15B as a set of circumferential grooves and ridges.

Upper component 210 has a downward-facing connection shoulder 217 configured for contact with an upward-facing connection shoulder 223 on lower component 220.

Upper component 210 has an external spline 213 having a selected number $n_U$ of spline ridges 213R and a corresponding number of spline grooves 213G, with each spline ridge 213R being configured to have a zero helical angle relative to longitudinal connection axis $A_C$, with spline 213 being configured for axial sliding engagement with an internal spline 232 in throughbore 230B of coupling ring 230. Similar to external spline 213, internal spline 232 has ny spline ridges 232R and a corresponding number of spline grooves 232G as shown in FIG. 9A, with each spline ridge 232R being configured to have a zero helical angle. Each spline ridge 213R on external spline 213 has a first ridge flank 213$f$ configured for sliding engagement with a first ridge flank 232$f$ on internal spline 232, plus a second ridge flank 213$s$ configured for sliding engagement with a second ridge flank 232$s$ on internal spline 232. In the illustrated embodiment (and by way of non-limiting example only), the value of $n_U$=15.

Upper end 220U of lower component 220 defines an upward-facing spline 222 having a selected number $n_L$ of spline ridges 222R and a corresponding number of spline grooves 222G, with the value of $n_L$ being different from the value of $n_U$. Spline 222 is configured for engagement with a downward-facing spline 231 on lower end 230L of coupling ring 230. Similar to upward-facing spline 222, downward-facing spline 231 has ng spline ridges 231R and a corresponding number of spline grooves 231G as shown in FIG. 9B. Each spline ridge 222R has a first flank 222f configured for engagement with a first flank 231f of a spline ridge 231R on downward-facing spline 231. First flanks 222f and 231f are axially tapered, with the tapered flank surfaces preferably (but not necessarily) following fully mating helical profiles. Each spline ridge 222R also has a second flank 222s configured for engagement with a second flank 231s of a spline ridge 231R on downward-facing spline 231. Second flanks 222s and 231s are axially tapered, with the tapered flank surfaces preferably (but not necessarily) following fully mating helical profiles. In the embodiment shown in FIGS. 8-15B (and by way of non-limiting example only), the value of $n_L$=14. Although $n_L$ is less than $n_U$ and the difference between $n_L$ and $n_U$ is one in this particular example, it is to be understood that ng could be greater than equal to $n_U$ in alternative embodiments, and that the difference between $n_L$ and $n_U$ could be greater than one.

The taper angle of first flanks 222f and 231f and the taper angle of second flanks 222s and 231s may be (but are not necessarily) the same. The value of the taper angles, otherwise understood as helix angles, of the flank surfaces is shown in the illustrated embodiment as being approximately 20 degrees relative to connection axis $A_C$. However, this is by way of non-limiting example only, and selection of the taper angle will typically be based on whether the user wants the spline engagement to be self-releasing or locking. More specifically, the included angle between the helix or taper angle of external spline 213 on upper component 210 (which will be zero when the flanks of external spline 213 are parallel to connection axis $A_C$) and the helix or taper angle of upward-facing spline 222 on lower component 220 must exceed a threshold value in order for the spline engagement to be self-releasing and non-locking, and this threshold value can be readily determined in accordance with methods familiar to persons of ordinary skill in the art, taking into consideration relevant variables such as material properties and friction coefficients.

Drive ring 240 has an internal drive thread 243 in throughbore 240B, configured for engagement with external drive thread 216 on upper component 210. Locking lug holes 241 in drive ring 240 may be aligned with locking lug holes 215 on upper component 210, whereupon locking lugs 250 may be threaded into locking lug holes 241 to secure connection assembly 200 by preventing rotation of drive ring 240 relative to upper component 210.

Figure 10:
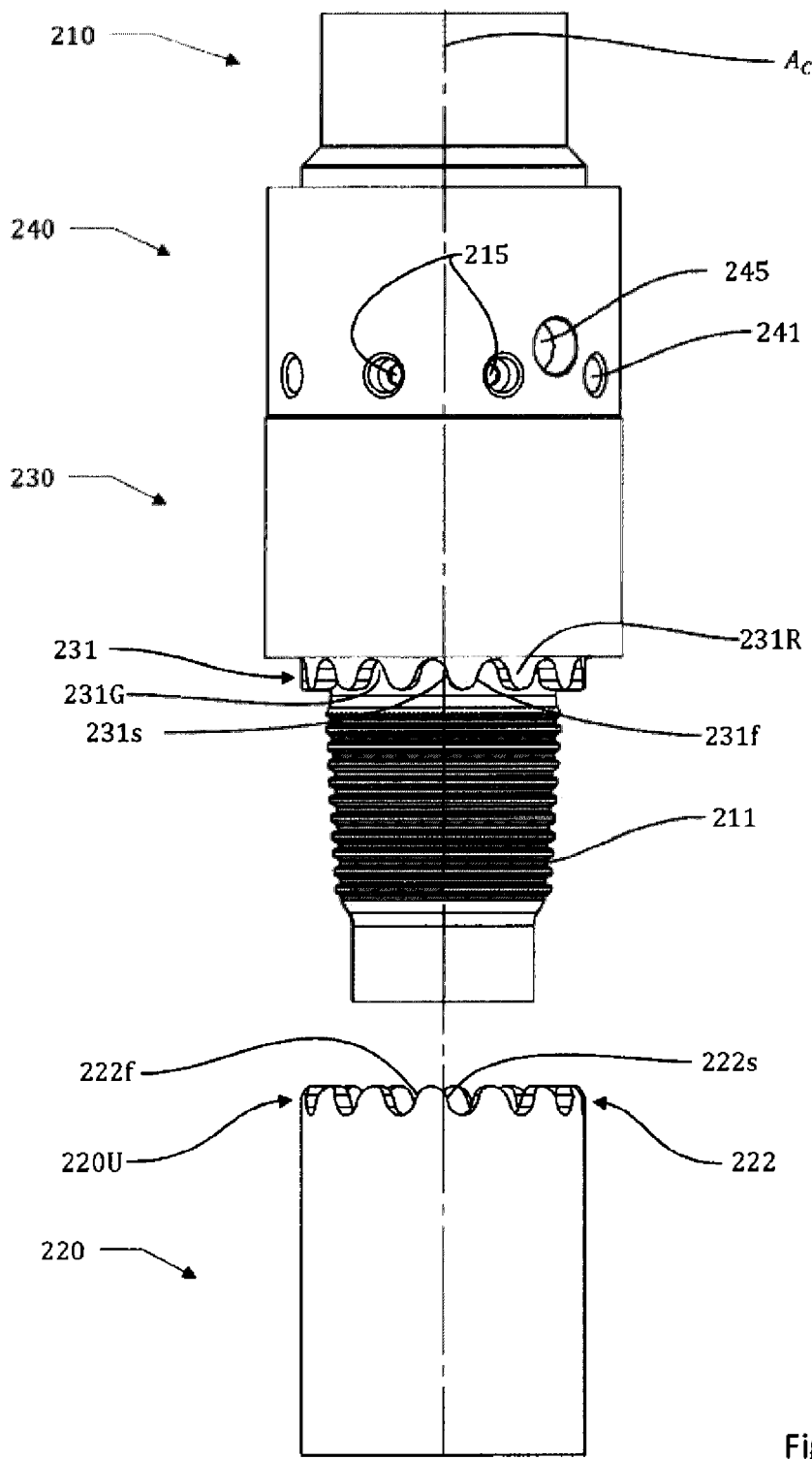
FIG. 10 is an elevation view of the (partially assembled) connection assembly in FIG. 8 in preparation for a connection makeup operation.

FIG. 10 is an elevation view of assembly 200 partially assembled in preparation for a connection makeup operation. Prior to makeup of connection threads 211 and 221, drive ring 240 is passed over external spline 213 on upper component 210 and mounted on upper component 210 by engagement of drive threads 243 and 216. Coupling ring 230 is slidingly mounted around upper component 210. Coupling ring 230 may be rotationally oriented to axially pass over external spline 213 to reach a free position where splines 213 and 232 are not engaged and coupling ring 230 is free to rotate.

Connection Makeup Procedure

Figures 11A, 11B:
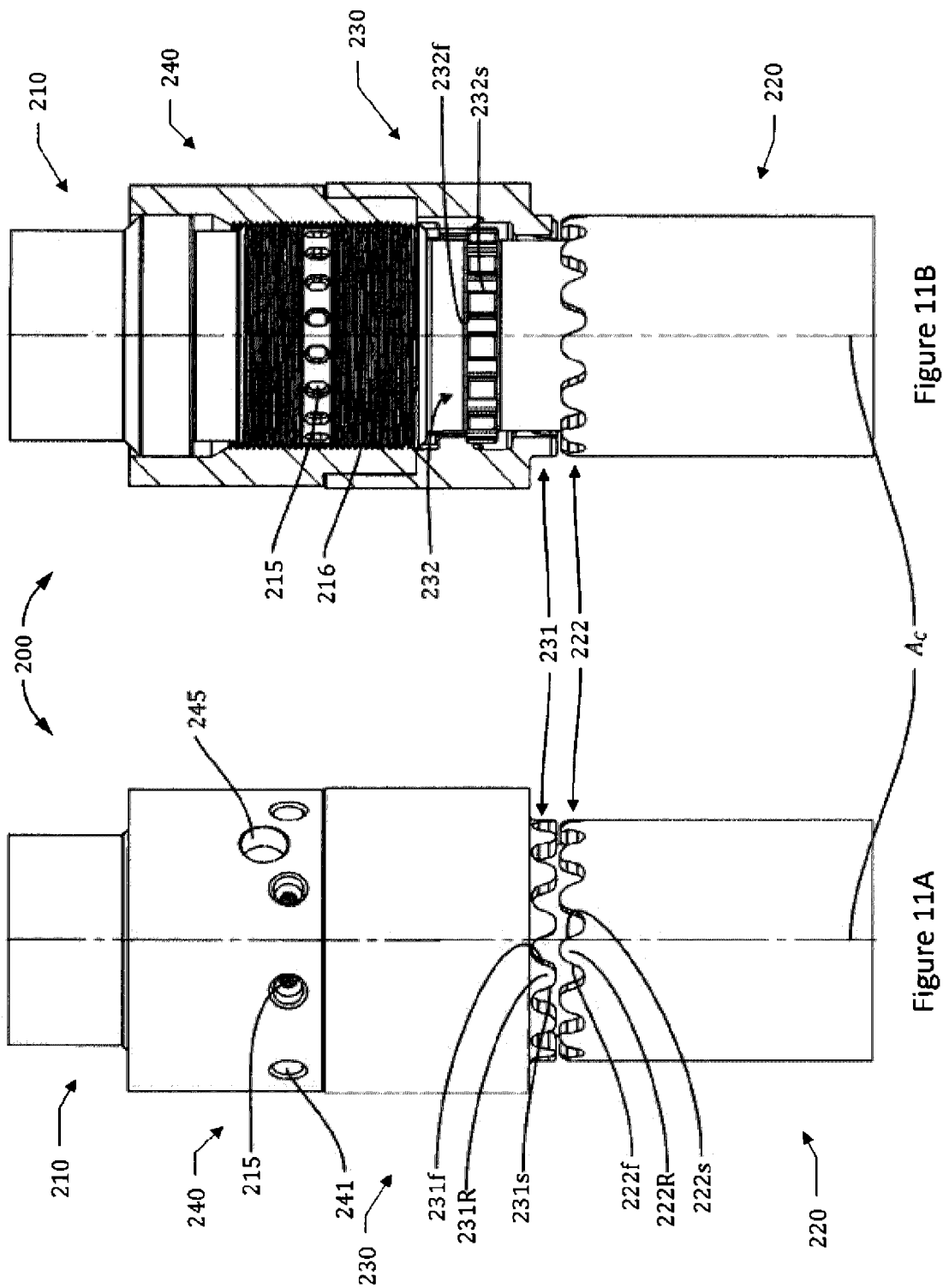
FIGS. 11A and 11B, respectively, are elevation and partial cross-section views of the connection assembly in FIG. 8 with an external thread on the upper component engaged to an internal thread on the lower component at a hand-tight position in the connection makeup operation FIGS. 12A and 12B, respectively, are elevation and partial cross-section views of the connection assembly in FIG. 8 with coupling ring rotated and axially translated to a position where a tapered downward-facing spline on the coupling ring is partially misaligned from a tapered upward-facing spline on the lower component.

FIGS. 11A and 11B, respectively, are elevation and partial cross-section views of assembly 200 at a hand-tight position in the connection makeup operation. Connection threads 211 and 221 are engaged and connection shoulders 217 and 223 are in contact with a small contact force. Splines 213 and 232 are not engaged, and splines 231 and 222 are also not engaged. Coupling ring 230 is in a free position and may rotate freely. Drive ring 240 is engaged with upper component 210 by external drive thread 216 and internal drive thread 243. There are $n_U$=15 rotational positions that may be selected at which ring 230 may be axially lowered to engage external spline 213 with internal spline 232. The phase difference (amount of misalignment) between downward-facing spline 231 and upward-facing spline 222 will depend on the selected rotational position of coupling ring 230, similar to a vernier scale.

FIGS. 12A and 12B, respectively, are elevation and partial cross-section views of connection assembly 200 with coupling ring 230 shown rotated to a selected rotational position and lowered, engaging splines 213 and 232. At the selected rotational position, upward-facing spline 222 and downward-facing spline 231 are misaligned (i.e., out of phase) such that axially-tapered first ridge flanks 222f and 231f are only partially engaged.

In the next step of the connection makeup operation, drive ring 240 is rotated relative to upper component 210 causing drive ring 240 to move axially down relative to upper component 210, and causing downward-facing drive shoulder 242 on drive ring 240 to contact upward-facing drive shoulder 233 on coupling ring 230, as shown in FIGS. 13A and 13B. In the final connection makeup step, drive ring 240 is further rotated relative to upper component 210, urging coupling ring 230 downward. As coupling ring 230 moves downward, tapered splines 231 and 222 move toward in-phase alignment as a result of the sliding engagement of the corresponding contacting spline ridge flanks (231f and 222f), and lower component 220 incrementally rotates relative to upper component 210, thus tightening the threaded connection of upper and lower components 210 and 220.

Figures 15A, 15B:
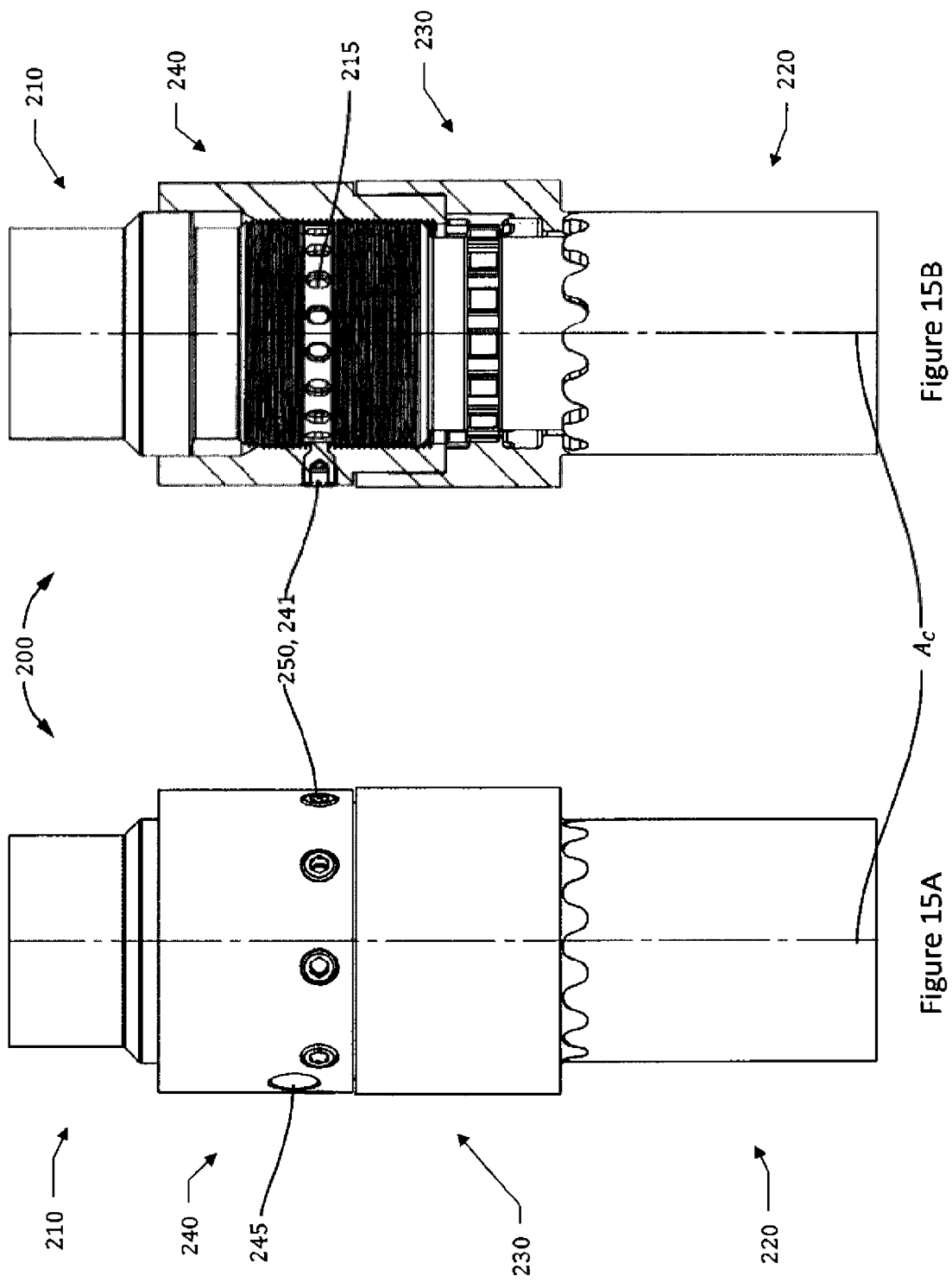
FIGS. 15A and 15B, respectively, are elevation and partial cross-section views of the connection assembly in FIG. 8 fully engaged and secured with locking lugs.

FIGS. 14A and 14B, respectively, are elevation and partial cross-section views of connection assembly 200 at the end of the connection makeup operation, with coupling ring 230 shown in a seated position. FIGS. 15A and 15B, respectively, are elevation and partial cross-section views showing connection assembly 200 with locking lugs 250 installed into locking lug holes 241 and 215 to prevent unintended rotation of coupling ring 230.

The torque required to rotate drive ring 240 during the final connection makeup step is substantially less than the resulting torque that urges relative rotation between lower component 220 and upper component 210, due to the mechanical advantage provided by the relative sliding action of drive threads 216 and 243; and the relative sliding action of first ridge flanks 222f and 231f. The magnitude of mechanical advantage will vary according to factors including the lead angle of drive threads 216 and 243, the taper angle of first ridge flanks 222f and 231f, and the friction forces between the sliding surfaces.

When desired, the threaded connection of upper and lower components 210 and 120 may be tightened further by performing the additional steps of:
1. rotating drive ring 240 relative to upper component 210 to axially raise drive ring 240;
2. raising coupling ring 230 to a free position where splines 213 and 232 are disengaged, splines 231 and 222 are disengaged, and coupling ring 230 is free to rotate around upper component 210;
3. rotating coupling ring 230 and selecting a new position of the $n_U$=15 rotational positions at which coupling ring 230 may be axially lowered to engage splines 213 and 232 and wherein lower splines 231 and 222 partially engage axially-tapered first ridge flanks 222*f* and 231*f*; and 4. rotating drive ring 240 relative to upper component 210 to axially lower drive ring 240 and urge coupling ring 230 into a seated position, wherein tapered lower splines 231 and 222 are in-phase aligned, and lower component 220 has rotated relative to upper component 210 to further incrementally tighten the threaded connection therebetween.

Steps 1-4 above may be repeated as many times as necessary to achieve a desired tightness of the threaded connection. Optionally, and as shown in FIGS. 11A, 12A, 13A, and 14A, one or more drive tool sockets 245 may be provided in drive ring 240 to facilitate manual rotation of drive ring 240 relative to upper component 210 with the aid of a steel bar or other suitable tool inserted in drive tool socket 245.

After the connection makeup operation, assembly 200 is locked from further relative rotation between upper component 210 and lower component 220 by rings 230 and 240 and locking lugs 250. Torque transmitted between upper component 210 and lower component 220 in excess of the torque resisted by friction between connection threads 211 and 221 and between connection shoulders 217 and 223 will flow through coupling ring 230 via splines 213 and 232 and via splines 231 and 222.

Coupling ring 230 is held axially in place, with both splines 213 and 232 engaged and splines 231 and 222 engaged, by drive ring 240. Unintentional rotation of drive ring 240 relative to coupling ring 230 (and upper component 210) will be resisted by friction between drive threads 216 and 243 and locking lugs 250.

Connection Breakout Procedure

Rings 230 and 240 may also be used to loosen the threaded connection of upper and lower components 210 and 220 by performing the steps of:

1. rotating drive ring 240 relative to upper component 210 to axially raise drive ring 240;
2. raising coupling ring 230 to a free position where splines 213 and 232 are disengaged, splines 231 and 222 are disengaged, and coupling ring 230 is free to rotate around upper component 210;
3. rotating coupling ring 230 and selecting a new rotational position at which coupling ring 230 may be axially lowered to engage splines 213 and 232 and wherein splines 231 and 222 partially engage axially-tapered second ridge flanks 222*s* and 231*s*; and
4. rotating drive ring 240 relative to upper component 210 to axially lower ring 240 and urge coupling ring 230 into a seated position, tapered splines 231 and 222 are in-phase aligned, and lower component 220 a has rotated relative to upper component 210 to incrementally loosen the threaded connection therebetween.

Third Exemplary Embodiment

Figure 16:
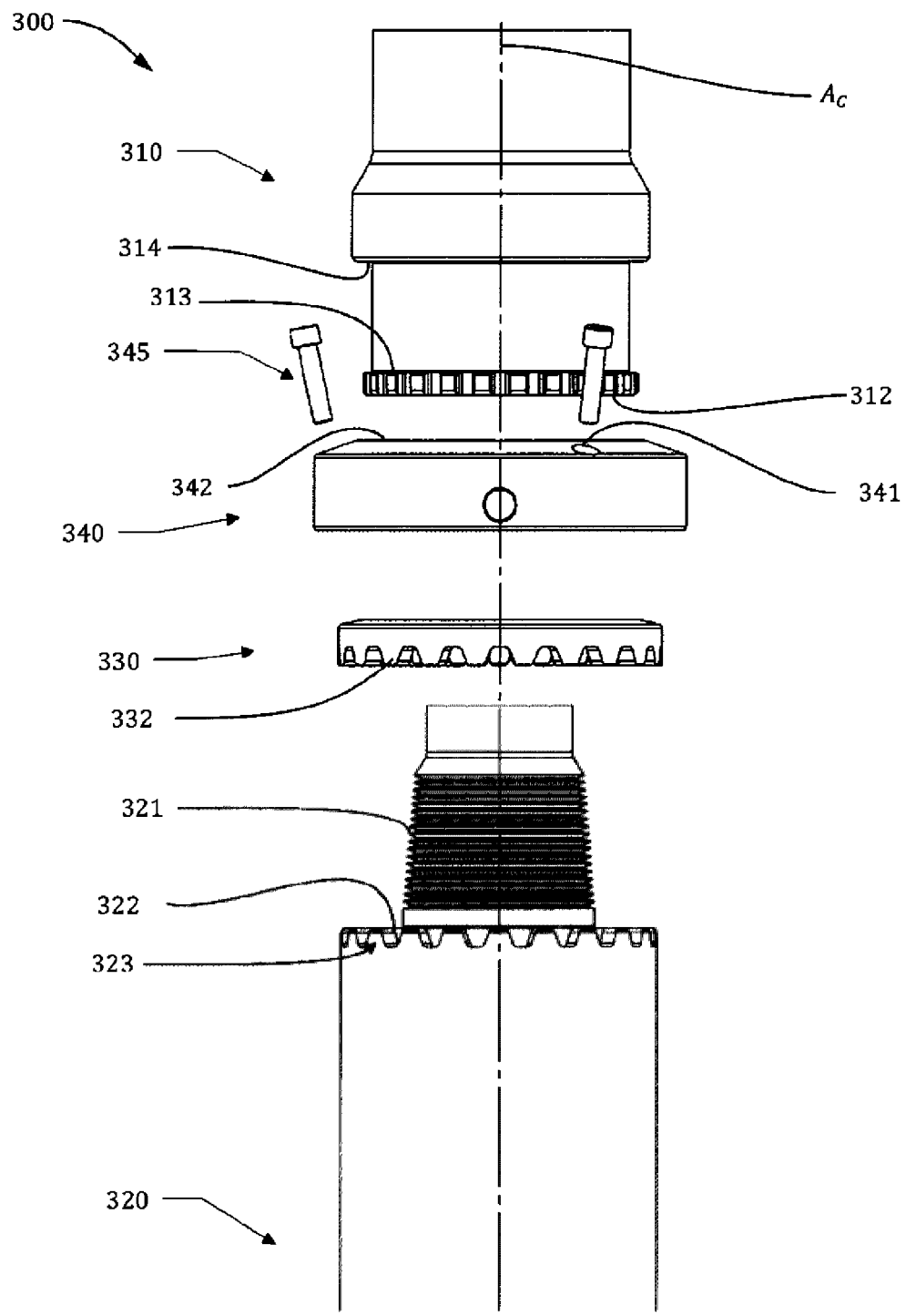
FIG. 16 is an exploded elevation of a third embodiment of a locking threaded connection assembly in accordance with the present disclosure, in which a jack screw arrangement is used to apply axial force to the coupling ring (instead of a drive ring as in the first and second embodiments).
Figure 17:
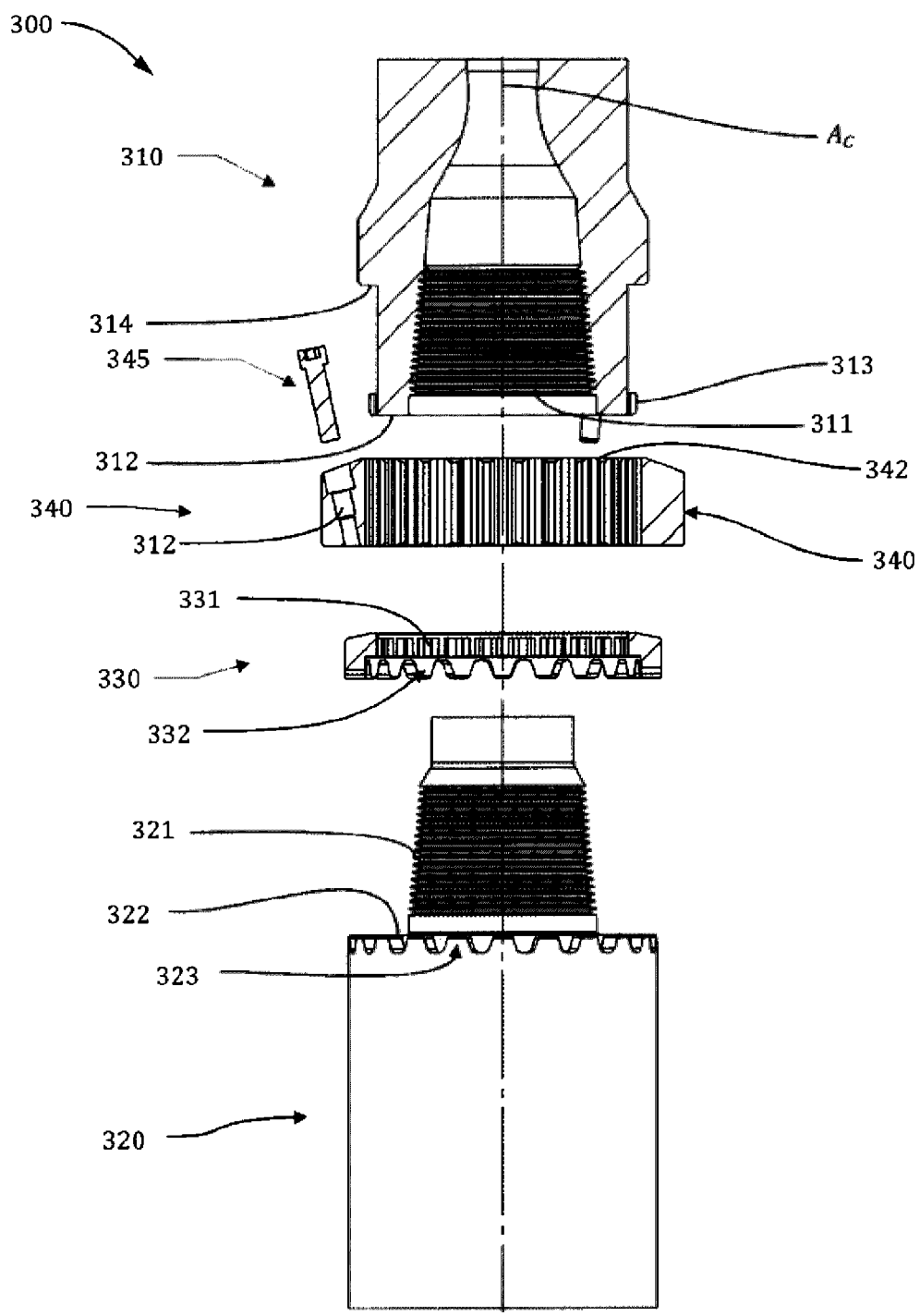
FIG. 17 is an exploded elevation of the connection assembly in FIG. 16, with the upper component, the coupling ring, and the drive ring assembly shown in cross-section.

FIGS. 16-19B illustrate a third exemplary embodiment 300 of a locking threaded connection assembly in accordance with the present disclosure. As shown in FIGS. 16 and 17, connection assembly 300 has a longitudinal connection axis $A_C$ and comprises an upper component 310, a lower component 320, and a coupling ring 330.

Lower component 320 has an external connection thread 321 threadingly engageable with an internal connection thread 311 on upper component 310. In this particular illustrated embodiment, and by way of non-limiting example only, connection threads 311 and 321 are shown as right-handed threads and, for drawing simplicity, are represented in FIGS. 16-19B as a set of circumferential grooves and ridges.

Lower component 320 has an upward-facing connection shoulder 322 configured for contact with a downward-facing connection shoulder 312 on upper component 110.

Coupling ring 330 has a first coupling ring torque transfer element 331 engageable with an upper torque transfer element 313 on upper component 310, and a second coupling ring torque transfer element 332 engageable with a lower torque transfer element 323 on lower component 320. Coupling ring 330 is axially movable between:

a free position in which coupling ring 330 is freely rotatable relative to both upper component 310 and lower component 320; and a seated position in which first coupling ring torque transfer element 331 engages upper torque transfer element 313, and second coupling ring torque transfer element 332 engages lower torque transfer element 323, such that coupling ring 330 prevents relative rotation between upper component 310 and lower component 320.

In the illustrated embodiment (and by way of non-limiting example only), upper torque transfer element 313 and first coupling ring torque transfer element 331 each have $n_U=24$ uniformly-spaced teeth, and lower torque transfer element 323 and second coupling ring torque transfer element 332 each have $n_L=21$ uniformly-spaced teeth. Each tooth of lower torque transfer element 323 has an axially-tapered flank slidingly engageable with an axially-tapered flank on a tooth of second coupling ring torque transfer element 332.

Connection assembly 300 further comprises axial force means for urging coupling ring 330 from the free position toward the seated position in the form of a drive plate 341 with a plurality of jackscrews 345. Drive plate 341 has a threaded screw hole 342 for each jackscrew 345, and an upward-facing drive shoulder 342 configured for contact with a downward-facing drive shoulder 314 on upper component 110. Jackscrews 345 may be turned to apply axial force to coupling ring 330.

When coupling ring 340 is in the free position, coupling ring 340 is rotatable to one or more selectable rotational positions in which the teeth of lower torque transfer element 323 are rotationally out of phase with the teeth of second coupling ring torque transfer element 332. FIGS. 18A and 18B, respectively, are elevation and partial cross-section views of connection assembly 300 with coupling ring 330 rotated and then axially translated to a position where second coupling ring torque transfer element 332 is partially misaligned from lower torque transfer element 323, and with jackscrews 345 partially axially extended downward from drive plate 340 such that jackscrews 345 bear on coupling ring 340.

Figures 19A, 19B:
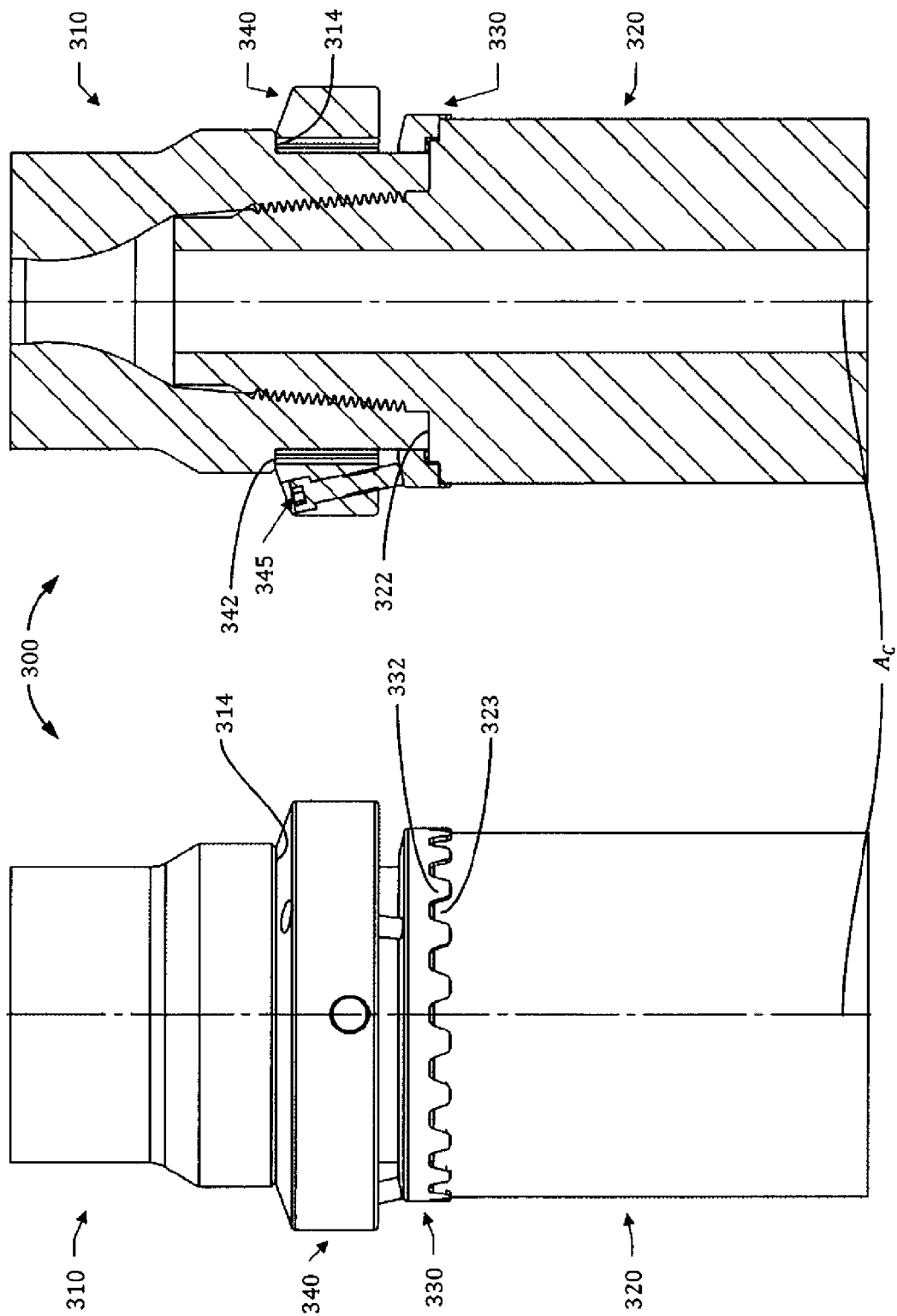
FIGS. 19A and 19B, respectively, are elevation and partial cross-section views of the connection assembly in FIG. 16, shown with the jackscrews further axially extended downward from the drive plate such that the second coupling ring torque transfer element has been urged into alignment with the lower torque transfer element and, simultaneously, the lower component has been urged to rotate relative to the upper component.

Movement of coupling ring 340 from the free position toward the seated position will urge relative rotation between upper component 310 and lower component 320 as a result of sliding engagement of the axially-tapered flanks of the teeth of lower torque transfer element 323 and second coupling ring torque transfer element 332. FIGS. 19A and 19B, respectively, are elevation and partial cross-section views of connection assembly 300 with jackscrews 345 further axially extended downward from drive plate 340 such that an upward-facing drive shoulder 342 of drive plate 340 bears on a downward facing drive shoulder 314 of upper component 310, and second torque transfer element 332 has been urged into full alignment with lower torque transfer element 323 and, simultaneously, lower component 320 has been urged to rotate relative to upper component 310, tightening connection threads 311 and 321.

It will be readily appreciated by persons skilled in the art that various modifications to embodiments in accordance with the present disclosure may be devised without departing from the scope of the present teachings, including modifications that use equivalent structures or materials hereafter conceived or developed.

It is especially to be understood that the scope of the present disclosure is not intended to be limited to described or illustrated embodiments, and that the substitution of a variant of any claimed or illustrated element or feature, without any substantial resultant change in functionality, will not constitute a departure from the scope of the disclosure.

In this patent document, any form of the word "comprise" is to be understood in its non limiting sense to mean that any element or feature following such word is included, but elements or features not specifically mentioned are not excluded. A reference to an element or feature by the indefinite article "a" does not exclude the possibility that more than one such element or feature is present, unless the context clearly requires that there be one and only one such element or feature.

Any use herein of any form of the terms "connect", "engage", "couple", "attach", or any other term describing an interaction between elements is not meant to limit the interaction to direct interaction between the subject elements, and may also include indirect interaction between the elements such as through secondary or intermediary structure.

Relational and conformational terms such as (but not limited to) "parallel", "vertical", "axial", "coaxial", and "helical" are not intended to denote or require absolute mathematical or geometrical precision. Accordingly, such terms are to be understood as denoting or requiring substantial precision only (e.g., "substantially parallel" or "generally helical") unless the context clearly requires otherwise. Unless the context clearly indicates otherwise, the term "vertical" as used herein is intended to mean parallel to the longitudinal connection axis. As used herein, the term "cylindrical" is intended to cover not only purely cylindrical elements but also elements that are cylindrical in cross-section but their cross-sectional configurations may vary along their axial lengths.

Wherever used in this document, the terms "typical" and "typically" are to be understood and interpreted in the sense of being representative of common usage or practice, and are not intended to be understood or interpreted as implying essentiality or invariability.

LIST OF COMPONENTS AND FEATURES

Feature Number Description
100 Locking threaded connection assembly
110 Upper component
111 External connection thread
112 Downward-facing connection shoulder on 110
113 External upper spline on 110
113G Spline groove on 113
113R Spline ridge on 113
113$f$ First ridge flank on 113R
113$s$ Second ridge flank on 113R
114 Downward-facing drive shoulder on 110
120 Lower component
120B Bore of 120
120U Upper end of 120
121 Internal connection thread on 120
122 Upward-facing connection shoulder on 120
125 External lower spline on 120
125G Spline groove on 125
125R Spline ridge on 125
125$f$ First ridge flank on 125R
125$s$ Second ridge flank on 125R
130 Coupling ring
130L Lower end of 130
130B Coupling ring throughbore
133 Internal upper spline on 130
133G Spline groove on 133
133R Spline ridge on 133
133$f$ First ridge flank on 133R
133$s$ Second ridge flank on 133R
135 Internal lower spline on 130
135G Spline groove on 135
135R Spline ridge on 135
135$f$ First ridge flank on 135R
135$s$ Second ridge flank on 135R
136 External drive thread on 130
140 Drive ring
140B Drive ring throughbore
144 Upward-facing drive shoulder on 140
146 Internal drive thread on 140
200 Locking threaded connection assembly
210 Upper component
211 External connection thread
217 Downward-facing connection shoulder on 210
213 External spline on 210
213G Spline groove on 213
213R Spline ridge on 213
213$f$ First ridge flank on 213R
213$s$ Second ridge flank on 213R
215 Locking lug holes on 210
216 External drive thread on 210
220 Lower component
220B Bore of 220
220U Upper end of 220
221 Internal connection thread on 220
222 Upward-facing spline on 220
222G Spline groove on 222
222R Spline ridge on 222
222$f$ First ridge flank on 222R
222$s$ Second ridge flank on 222R
223 Upward-facing connection shoulder on 220
230 Coupling ring
230B Throughbore of 230
230L Lower end of 230
231 Downward-facing spline on 230
231$f$ First ridge flank on 231R
231$s$ Second ridge flank on 212R
231$f$ First ridge flank on 231
231$s$ Second ridge flank on 231
232 Internal spline on 230
232G Spline groove on 232
232R Spline ridge on 232
232$f$ First ridge flank on 232R
232$s$ Second ridge flank on 232R
233 Upward-facing drive shoulder on 230
240 Drive ring
240B Throughbore of 240
241 Locking lug holes on 240
242 Downward-facing drive shoulder on 240
243 Internal drive thread on 240
245 Drive tool socket on 240

250 Locking lugs
300 Locking threaded connection assembly
310 Upper component
311 Internal connection thread
312 Downward-facing connection shoulder
313 Upper torque transfer element
314 Downward-facing drive shoulder on 310
320 Lower component
321 External connection thread
322 Upward-facing connection shoulder
323 Lower torque transfer element
330 Coupling ring
331 First coupling ring torque transfer element
332 Second coupling ring torque transfer element
340 Drive plate
341 Threaded screw hole
342 Upward-facing drive shoulder on 340
345 Jackscrew
$A_C$ Longitudinal connection axis of connection assembly 100, 200, or 300
RL Reference line on upper component 110 of assembly 100

The invention claimed is:

1. A threaded connection assembly comprising:
   (a) an upper component having an upper torque transfer element comprising a plurality of uniformly-spaced teeth;
   (b) a lower component threadingly engageable with the upper component and having a lower torque transfer element comprising a plurality of uniformly-spaced teeth;
   (c) a coupling ring having a first coupling ring torque transfer element engageable with the upper torque transfer element, and a second coupling ring torque transfer element engageable with the lower torque transfer element, said coupling ring being axially movable between:
      a free position in which the coupling ring is freely rotatable relative to both the upper component and the lower component; and
      a seated position in which the first coupling ring torque transfer element engages the upper torque transfer element, and the second coupling ring torque transfer element engages the lower torque transfer element, such that the coupling ring prevents relative rotation between the upper component and the lower component; and
   (d) axial force means for urging the coupling ring from the free position toward the seated position;
   wherein:
   (e) the upper component, the lower component, and the coupling ring are coaxial about a longitudinal connection axis;
   (f) the upper torque transfer element and the lower torque transfer element have different numbers of teeth;
   (g) each tooth of the lower torque transfer element has an axially-tapered flank slidingly engageable with an axially-tapered flank on a tooth of the second coupling ring torque transfer element, such that when the teeth of the lower torque transfer element are rotationally out of phase with the teeth of the second coupling ring torque transfer element, movement of the coupling ring from the free position toward the seated position will urge relative rotation between the upper and lower components as a result of sliding engagement of the axially-tapered flanks of the teeth of the lower torque transfer element and the second coupling ring torque transfer element; and
   (h) when the coupling ring is in the free position, the coupling ring is rotatable to one or more selectable rotational positions in which the teeth of the lower torque transfer element are rotationally out of phase with the teeth of the second coupling ring torque transfer element.

2. The threaded connection assembly as in claim 1 wherein both flanks of each tooth of the lower torque transfer element and the second coupling ring torque transfer element are axially tapered.

3. The threaded connection assembly as in claim 2 wherein both flanks of each tooth of the lower torque transfer element and the second coupling ring torque transfer element have axial taper angles of equal magnitude.

4. The threaded connection assembly as in claim 1 wherein:
   (a) the upper and lower components are cylindrical components having respective internal bores; and
   (b) the coupling ring is coaxially aligned with the upper and lower components and is located within the internal bore of a selected one, or both, of the upper and lower components.

5. The threaded connection assembly as in claim 1 wherein the upper torque transfer element comprises an external spline, and the first coupling ring torque transfer element comprises an internal spline.

6. The threaded connection assembly as in claim 1 wherein the lower torque transfer element comprises an external spline, and the second coupling ring torque transfer element comprises an internal spline.

7. The threaded connection assembly as in claim 1 wherein the lower torque transfer element and the second coupling ring torque transfer element are configured for engagement in the manner of a dog clutch.

8. The threaded connection assembly as in claim 7 wherein the teeth of the lower torque transfer element and the second coupling ring torque transfer element are at least partially of curvilinear configuration.

9. The threaded connection assembly as in claim 1 wherein when the coupling ring is in one of the one or more selectable rotational positions, movement of the coupling ring from the free position to the seated position will urge relative rotation of the upper and lower components in a rotational direction tending to tighten the threaded connection.

10. The threaded connection assembly as in claim 1 wherein when the coupling ring is in one of the one or more selectable rotational positions, movement of the coupling ring from the free position to the seated position will urge relative rotation of the upper and lower components in a rotational direction tending to loosen the threaded connection.

11. The threaded connection assembly as in claim 1 wherein the axially-tapered flanks of the teeth of the lower torque transfer element and the second coupling ring torque transfer element follow a helical profile.

12. The threaded connection assembly as in claim 1 wherein the axial force means comprises a drive ring threadingly engageable with the coupling ring, and having an annular shoulder configured for sliding contact with an annular shoulder on a selected one of the upper and lower components, such that rotation of the drive ring relative to the coupling ring will urge axial movement of the coupling ring relative to the upper and lower components.

13. The threaded connection assembly as in claim 12, further comprising locking means for preventing relative rotation between the drive ring and the selected one of the upper and lower components.

14. The threaded connection assembly as in claim 13 wherein the locking means is provided by one or more locking lugs insertable through holes in the drive ring and into holes in the selected one of the upper and lower components.

15. The threaded connection assembly as in claim 12, further comprising drive ring rotation means for rotating the drive ring.

16. The threaded connection assembly as in claim 15 wherein the drive ring rotation means is provided by one or more drive tool sockets formed in the drive ring.

17. The threaded connection assembly as in claim 1 wherein the axial force means comprises a drive ring having an annular shoulder configured for sliding contact with an annular shoulder on the coupling ring, with the drive ring being threadingly engageable with a selected one of the upper and lower components, such that rotation of the drive ring relative to the selected one of the upper and lower components will urge axial movement of the coupling ring relative to the upper and lower components.

18. The threaded connection assembly as in claim 1 wherein the axial force means comprises a plurality of jackscrews threadingly engaging a plate, wherein:
  (a) the plate has an axial surface contacting an axial shoulder surface on a selected one of the upper and lower components; and
  (b) the jackscrews bear against the coupling ring;
such that rotation of the jack screws relative to the plate will urge axial movement of the coupling ring relative to the upper and lower components.

* * * * *